United States Patent
Blanc et al.

(10) Patent No.: US 10,709,286 B2
(45) Date of Patent: Jul. 14, 2020

(54) SYSTEM FOR PRODUCING BEVERAGES BY INFUSION

(71) Applicant: Compagnie Mediterraneenne Des Cafes, Carros (FR)

(72) Inventors: Jean-Pierre Blanc, Nice (FR); Bertrand Thibault, Nice (FR)

(73) Assignee: COMPAGNIE MEDITERRANEENNE DES CAFES, Carros (FR)

( * ) Notice: Subject to any disclaimer, the term of this patent is extended or adjusted under 35 U.S.C. 154(b) by 647 days.

(21) Appl. No.: 14/908,984

(22) PCT Filed: Jul. 30, 2014

(86) PCT No.: PCT/EP2014/066439
§ 371 (c)(1),
(2) Date: Jan. 29, 2016

(87) PCT Pub. No.: WO2015/014916
PCT Pub. Date: Feb. 5, 2015

(65) Prior Publication Data
US 2016/0166104 A1    Jun. 16, 2016

(30) Foreign Application Priority Data

Jul. 30, 2013 (FR) .................................. 13 57545

(51) Int. Cl.
*A47J 31/40* (2006.01)
*A47J 31/36* (2006.01)

(52) U.S. Cl.
CPC ......... *A47J 31/407* (2013.01); *A47J 31/3633* (2013.01)

(58) Field of Classification Search
CPC ...... A47J 31/3633; A47J 31/407; A47J 31/46; A47J 31/3638; A47J 31/40; A47J 31/465; A47J 31/58
(Continued)

(56) References Cited

U.S. PATENT DOCUMENTS

| 2010/0159108 A1* | 6/2010 | Blanc | A47J 31/3633 426/590 |
| 2010/0189859 A1* | 7/2010 | Blanc | A47J 31/3633 426/394 |
| 2012/0292345 A1* | 11/2012 | Kharas | B05B 11/0027 222/173 |

FOREIGN PATENT DOCUMENTS

| EP | 2205133 | 4/2014 |
| FR | 2916336 | 11/2008 |

(Continued)

OTHER PUBLICATIONS

International Search Report, with English-language translation, dated Oct. 21, 2014, for International Application PCT/EP2014/066439, filed Jul. 30, 2014, Applicant, Compagnie Mediterraneenne Des Cafes (7 pages).
(Continued)

*Primary Examiner* — Phuong T Nguyen
(74) *Attorney, Agent, or Firm* — McCracken & Gillen LLC

(57) ABSTRACT

The present invention relates to a system for making beverages by infusing a dose of product to be infused comprising: an infusion chamber defined by a first and a second chamber portions wherein at least one is movable; an actuator arranged to control the closure of the infusion chamber; a closure device comprising upstream closure means and downstream closure means allowing or preventing entry to or exit from the infusion chamber, respectively; the system being arranged such that the system comprises at
(Continued)

Figure 1:
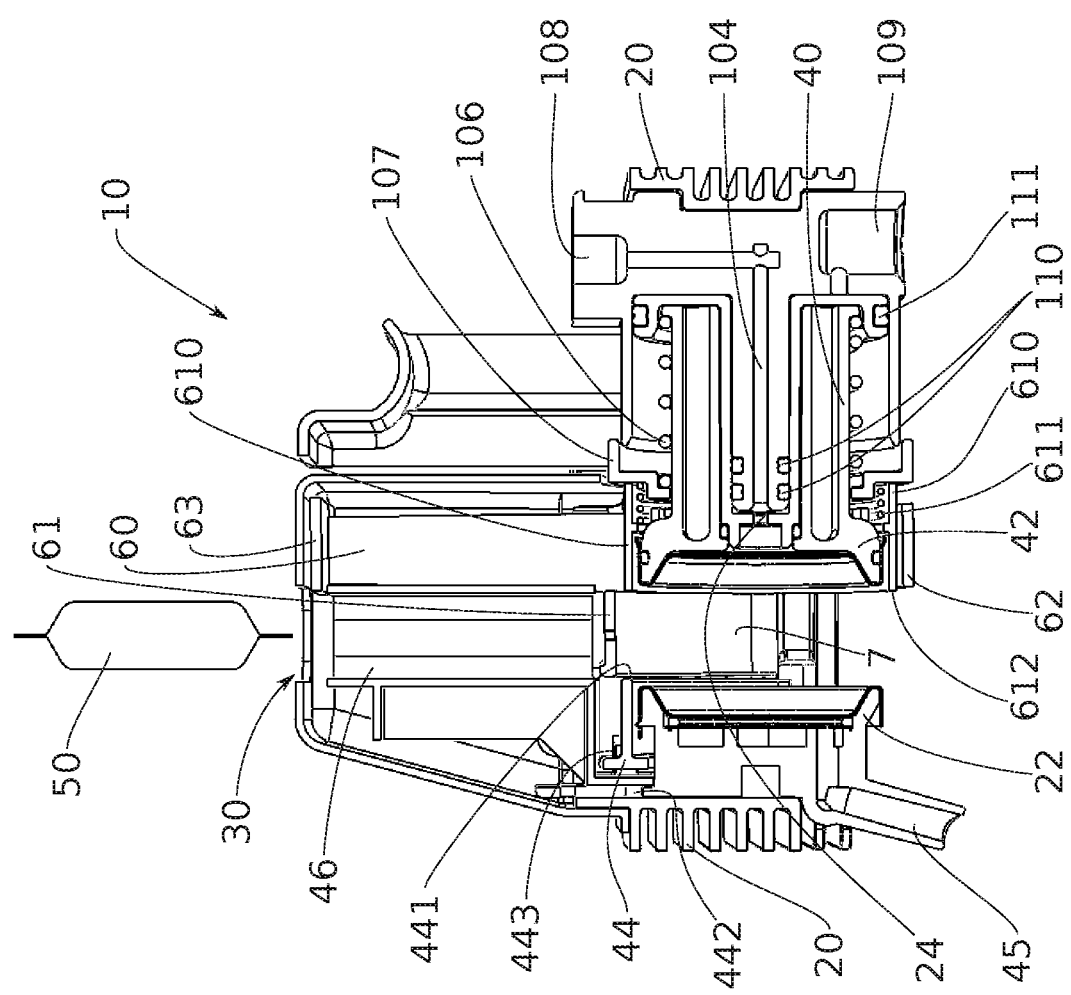
Figure 2:
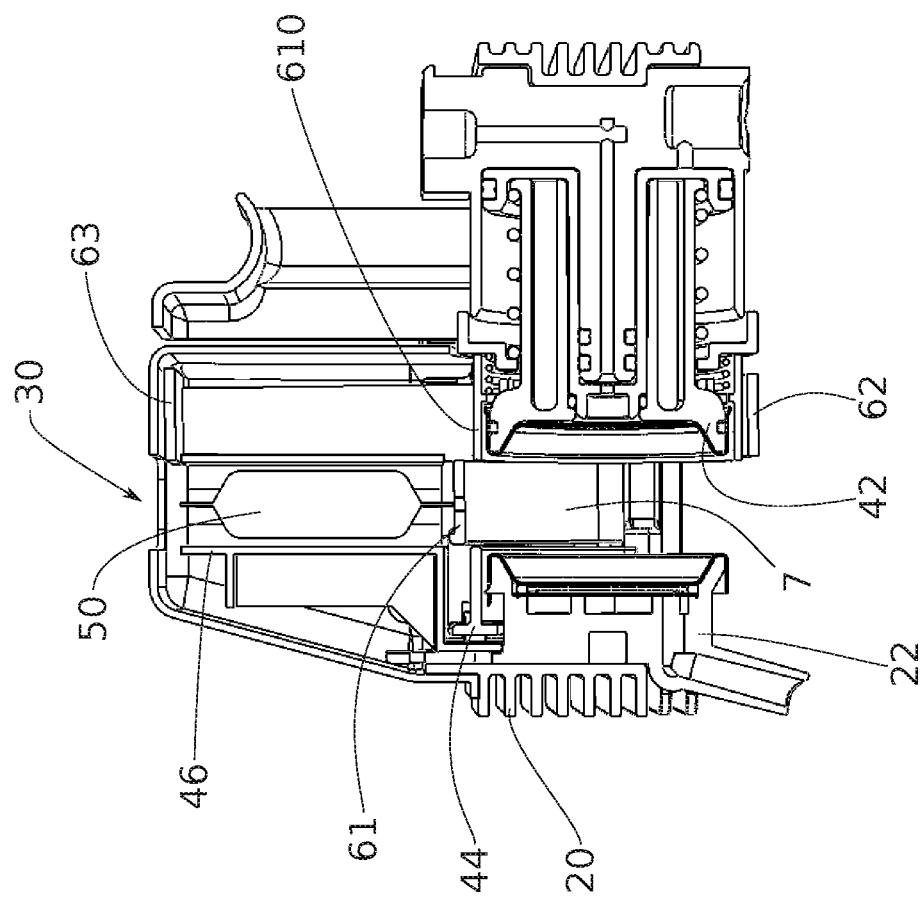
Figure 3:
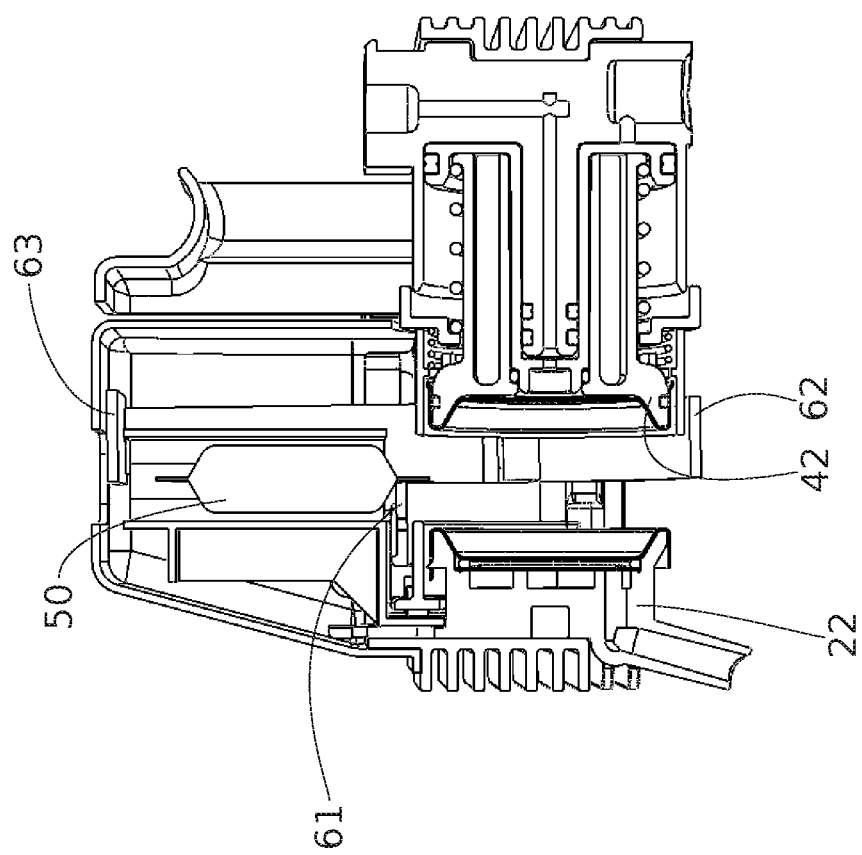
Figure 4:
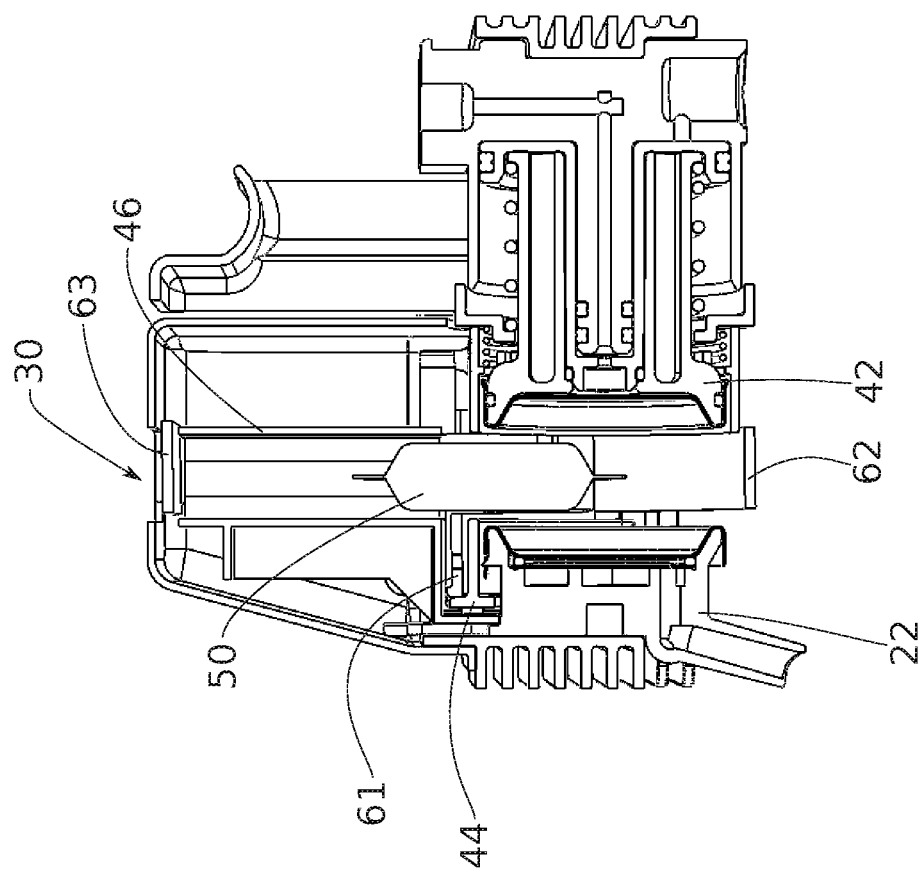
Figure 5:
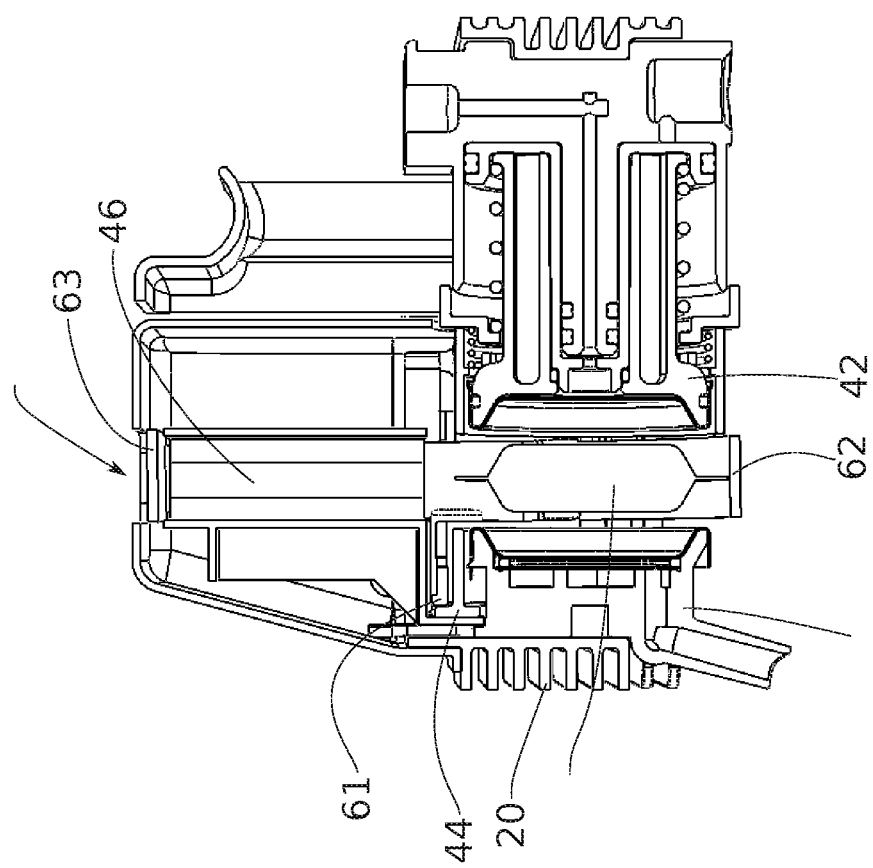

least one incoming fluid pipe configured to supply the infusion chamber with fluid to be infused, and being characterized in that the first chamber portion, interconnected with the actuator, comprises at least partially said incoming fluid pipe.

29 Claims, 19 Drawing Sheets

(58) Field of Classification Search
USPC ......... 99/279, 280, 295, 298, 288, 289, 300, 99/302, 323
See application file for complete search history.

(56) References Cited

FOREIGN PATENT DOCUMENTS

| | | |
|---|---|---|
| FR | 2976779 | 12/2012 |
| WO | WO 2008/012316 | 1/2008 |
| WO | WO 2010/009753 | 1/2010 |
| WO | WO 2011/147792 | 12/2011 |

OTHER PUBLICATIONS

International Written Opinion dated Oct. 21, 2014,for International Application PCT/EP2014/066439, filed Jul. 30, 2014, Applicant, Compagnie Mediterraneenne Des Cafes (7 pages).

* cited by examiner

SYSTEM FOR PRODUCING BEVERAGES BY INFUSION

The present invention concerns a device for making beverages by infusing a product with a dosage form.

It finds its application more particularly in the field of espresso-type coffee machines. It may also be used to make other beverages such as tea.

Many coffee machines now use doses also referred to as capsules or packages that form a relatively compact infusion product.

Generally, beverage preparation machines comprise an infusion chamber designed to receive hot water and a dose of product to be infused. The reliability of the insertion of the dose and its removal from the infusion chamber poses many difficulties.

The documents WO2011147792 and FR2916336 propose machines with a particularly high reliability. This high reliability results essentially from a sequential operation of the machine relying on a number of specific parts and very specific kinematics.

In a context where consumers are looking for ever higher taste quality, it is necessary to adapt the doses or product to be infused to the infusion conditions with precision. Indeed, the quality of the beverage obtained in the cup, for example coffee, requires the infusion parameters such as pressure, temperature, water volume to be adapted to numerous dose-related parameters such as: the variety of the coffee, granularity of the ground product, the volume of coffee, etc.

Coffee roasters thus design their doses for specific machines for these doses.

Specific doses have thus been developed and are intended to be used with a certain type of machine.

In practice, it is found that users use unsuitable doses with their machine.

Hence the quality of the coffee obtained is much lower, which may deter the user from this machine even though it could meet the user's needs perfectly if it was used with suitable doses.

More detrimentally, a dose which is unsuitable for the machine wherein it is inserted may not withstand the infusion conditions. Under the effect of pressure and/or temperature, the unsuitable dose may rupture during infusion, generally resulting in machine damage. In some cases, this rupture may give rise to leakages of very hot pressurized fluid, which inevitably poses safety problems for users.

Therefore, there is a need consisting of preventing the use in a particular type of machine of doses not specifically designed for this particular type of machine.

The invention aims to achieve at least one of these objectives. For this purpose, the invention envisages a system for making beverages from a dose comprising a product to be infused and having a circumferential border, the system comprising: a first and a second parts having a relative mobility while translating and defining in part at least one receiving assembly intended to receive the dose prior to the positioning thereof in an infusion position. The first part comprises at least one support zone configured to come into contact with the dose so as to support the dose in a first relative position of the first and second parts. The system is arranged in such a way that, during the relative translation of the first and second parts, the second part forms means for bearing on the dose to induce the sliding of the dose along at least one support zone of the first part for the positioning thereof in the infusion position. Advantageously, the system also comprises at least one axial stop, interconnected with the first part, arranged below said at least one support zone along a projection on a vertical plane perpendicular to the axis of said translation. Said axial stop is accessible, preferably vertically accessible, from the space wherein the dose is intended to slide during the relative translation of the first and second parts.

As such, if the dose has a circumferential border or a shape which comes into contact with the axial stop, the latter blocks the sliding of this dose. Consequently, if the user inserts into the machine such a dose not intended for this machine, the system blocks the dose and prevents the insertion thereof into the infusion chamber. On the other hand, if the dose does not have a circumferential border or a shape which comes into contact with the axial stop, the axial stop does not block the sliding of this dose. The system thus allows the use of this dose with the machine.

Moreover, the solution according to the invention makes it possible to only have to modify the support zones and the stop so as to define the machines compatible with a type of dose and those which are not. As such, this represents a significant advantage in terms of design and production cost.

Also optionally, the invention further comprises at least one of following optional features:

Advantageously, the axial stop is arranged to come into contact with a dose wherein the circumferential border would have a portion salient in the downward direction from a horizontal plane through the support zone when the dose is in the receiving assembly, thus blocking the sliding of such a dose relative to the first part. As such, if the dose has a portion salient in the downward direction from the support zone, the axial stop blocks the sliding of this dose. Consequently, if the user inserts into the machine a dose not intended for this machine, the system blocks the dose and prevents the insertion thereof into the infusion chamber. On the other hand, if the dose does not have a portion salient in the downward direction from the support zone, the axial stop does not block the sliding of this dose. The system thus allows the use of this dose with the machine.

Advantageously, the at least one axial stop is entirely arranged below the support zone along a projection on a vertical plane perpendicular to the axis of said translation. It does not extend above a plane defined by the support zone. As such, it cannot block a dose which does not extend below the support zone.

Advantageously, the stop is accessible from the receiving position or from any position situated on the stroke in translation prior to the positioning of the dose in the infusion position.

According to one embodiment, said axial stop is

According to one embodiment, the system comprises at least one opening borne by the first part and situated vertically below the support zone, said opening giving access to the axial stop. Advantageously and optionally, said opening is configured to give vertical access to the axial stop.

According to one embodiment, the system comprises at least one opening borne by the first part and situated vertically below the support zone, said axial stop being formed by an outline of the opening.

According to one embodiment, the system comprises at least one open volume situated vertically below the support zone, the open volume being configured to enable access to the axial stop from the support zone.

Advantageously, the system comprises at least one open volume situated vertically below the support zone and preferably adjacent to the support zone. Preferably, the axial stop is situated in the open volume. Preferably, the open volume is configured to be suitable for entry by a dose not suitable for the system wherein the circumferential border has a portion salient in the downward direction when the dose is in the receiving assembly.

Preferably, the first and second parts are situated upstream from a dose infusion chamber and are configured to be reached by the dose before the latter is enclosed in the infusion chamber.

The open volume is accessible from the receiving assembly.

Advantageously, the open volume is formed by an opening defined by an outline. As such, the system blocks the sliding of a type of dose wherein a portion enters the opening and allows the sliding of the doses not entering the opening.

Advantageously, the axial stop is formed by a portion at least of the outline. The opening forms a slot. Preferably, the axial stop is formed by an outline of the slot.

Advantageously, the at least one support zone forms a vertical stop, blocking the movement of the dose under the effect of the weight thereof.

The at least one support zone is configured to retain the dose upstream from the infusion chamber when this support zone is positioned opposite the opening enabling access to the infusion chamber from upstream of the infusion chamber. The support zone thus prevents the dose from falling into the chamber.

Preferably, the system comprises at least two support zones.

Advantageously, the two support zones define a substantially horizontal plane along with a first and a second space portions situated above and below said plane, respectively, along a vertical direction and wherein the axial stop is arranged in the second space portion so as to come into contact with a dose portion entering this second space portion.

Preferably, the distance between said plane and the axial stop is between 0.5 mm and 5 mm.

Advantageously, the two support zones form two salient parts extending above a profile bearing the axial stop along a vertical direction.

Advantageously, the system is configured in such a way that, at the end of sliding, the first part is retracted, at least in part under the second part along a vertical direction such that the dose can move under the effect of gravity.

Preferably, the system includes a pump for supplying the infusion chamber with fluid, and/or an actuator for moving two chamber portions forming the infusion chamber in relation to one another and including slaving means (80) arranged to prevent the operation of the pump if the first part prevents the sliding of the dose.

Advantageously, the first and second parts are movable and fixed respectively in relation to a frame of the system.

Advantageously, the first and second parts are fixed and movable respectively in relation to a frame of the system.

Advantageously, the first part forms upstream closure means or is interconnected with upstream closure means, the upstream closure means being arranged so as to selectively prevent or allow the entry of the dose into the infusion chamber according to the relative position of the first part with respect to the second part. As such, the first part bears the axial stop and the support zones. In order to render a machine compatible with one dose type and incompatible with another dose type, it is then simply necessary to modify the configuration of the first part. The rest of the infusion group does not need to be modified, which represents a considerable advantage in terms of design and production cost.

Preferably, the system comprises an infusion chamber designed to receive a dose, the infusion chamber being defined by at least one first and one second chamber portions, the chamber portions being arranged so as to move apart from one another or come together in order to respectively close or open the infusion chamber,
a closure device comprising: upstream closure means interconnected with the first part, downstream closure means arranged so as to selectively prevent or allow the dose to exit the infusion chamber;
the closure device being arranged so as to pass alternatively:
from said first position, the closure device being arranged so that in said first position: the upstream closure means prevent a dose from entering the infusion chamber; the downstream closure means allow the dose to exit the infusion chamber;
to a second position wherein: the upstream closure means allow the dose to enter the chamber at the end of sliding; the downstream closure means allow the reception of the dose introduced into the infusion chamber and prevent the latter from exiting the infusion chamber.

Advantageously, the upstream closure means and the downstream closure means are interconnected with each other.

Preferably, the first part has a circular portion. Preferably, the second part is borne by the guiding means or by a frame of the system Advantageously, the system comprises guiding means arranged so as to guide the dose to be received on the first part and to maintain it in position until the end of sliding and wherein the bearing means of the second part are borne by the guiding means.

Advantageously, the bearing means are configured to bear on a zone of the dose containing the product to be infused. Alternatively, the bearing means are configured to bear on a circumferential border of the dose.

Advantageously, the bearing means are formed at least in part by an inner face of a hopper forming a guide for the dose when receiving same on the first part.

Advantageously, the system being arranged in such a way that:
in a first relative position of the upstream closure means with respect to the bearing means, the upstream closure means form a vertical stop preventing a dose inserted in the machine from moving under the effect of gravity;
in a second relative position of the upstream closure means with respect to the bearing means, the vertical stop is not situated opposite preventing same from entering the chamber under the effect of gravity.

According to a first embodiment, the first part is configured to receive the dose alone. Alternatively, the first part is configured not to receive the dose alone. It forms for example an inclined surface.

Advantageously, the support surface is continuous or discontinuous. It is localized or continuous.

According to a further embodiment, the invention relates to a system for making beverages from a dose comprising a product to be infused and having a circumferential border, the system comprising: a first and a second parts having a relative mobility while translating and defining in part at least one receiving assembly intended to receive the dose prior to the positioning thereof in an infusion position. The first part comprises at least one support zone configured to come into contact with the dose so as to support the dose in a first relative position of the first and second parts. The system is arranged in such a way that, during the relative translation of the first and second parts, the second part forms means for bearing on the dose to induce the sliding of the dose along at least one support zone of the first part for the positioning thereof in the infusion position. The axial stop is accessible from the space wherein the dose is intended to slide along the at least one support zone of the first part for the positioning thereof in the infusion position.

According to a further embodiment, the invention relates to a system according to the invention along with a dose.

According to a further embodiment, the invention relates to a machine for making beverages comprising a system according to any one of the preceding claims and an infusion chamber and a pump.

According to a further embodiment, the invention relates to an assembly comprising at least one dose comprising a product to be infused and having a circumferential border and a system for making beverages from such a dose, the system comprising:
  a first and a second parts having a relative mobility while translating and defining in part at least one receiving assembly intended to receive the dose prior to the positioning thereof in an infusion position,
  the system being arranged in such a way that, during the relative translation of the first and second parts, the second part forms means for bearing on the dose to induce the sliding of the dose along at least one support zone of the first part for the positioning thereof in the infusion position.

The system also comprises at least one axial stop, interconnected with the first part accessible, advantageously and optionally vertically accessible, from the space wherein the dose is intended to slide during the relative translation of the first and second parts, the circumferential border of the dose and the axial stop being arranged in relation to one another such that the axial stop does not come into contact with the circumferential border of the dose when the dose slides along the first part, thus allowing the dose to slide freely and be positioned in the infusion position.

As such, if the dose and the axial stop are arranged in relation to one another such that the axial stop does not come into contact with the circumferential border of the dose when the dose slides, the dose moves beyond the stop and can be positioned in the infusion position. On the other hand, if the dose is not compatible with the system, i.e. if the dose and the axial stop are not arranged in relation to one another such that the axial stop does not come into contact with the circumferential border of the dose when the dose slides, the dose abuts on the axial stop and cannot be positioned in the infusion position. The system is then blocked and the beverage cannot be prepared.

Also optionally, the invention further comprises at least one of following optional features:

Advantageously, the axial stop and the circumferential border of the dose have complementary shapes and arranged such that the axial stop does not come into contact with the dose when the dose slides on the first part.

Advantageously, the axial stop is arranged below said support zone along a projection on a vertical plane perpendicular to the axis of said translation.

Advantageously, the first part comprises at least two support zones and the portion of the circumferential border of the dose intended to be position between the two support zones is rectilinear or concave.

Advantageously, the first part has two support zones, an opening situated between the two support zones, a portion of an outline of the opening forming the axial stop. The dose has a reinforcement defining a portion at least of the circumferential border thereof and configured to bear on the two support zones and the reinforcement has a shape configured not to enter the opening when it bears on the two support zones.

As such, a reinforcement defining the circumferential border of such a dose would not come into contact with the axial stop during the sliding thereof. On the other hand, a dose wherein the circumferential border has a portion that is convex or salient in the downward direction from a horizontal plane via the support zone when the dose is in the receiving assembly, would be blocked.

Advantageously, the dose has a circumferential border having a polygonal and preferably square shape.

Advantageously, the dose includes a first coating and a second coating assembled at the periphery thereof in a joint face so as to define a volume for receiving the product to be infused, wherein the circumferential border is substantially square, the length of one side being between 5 cm and 5.5 cm and has an arc-shaped connection fillet at each of the corners thereof.

Advantageously, the sliding stroke has a length greater than half the thickness of the dose, and preferably greater than the thickness of the dose, the thickness of the dose being measured along a direction parallel with the sliding.

Preferably, the system is configured such that the dose is positioned on the first part under the effect of gravity. This makes it possible to render the operation particularly reliable. Preferably, the system is configured such that, at the end of sliding, the dose is positioned in the infusion position under the effect of gravity. This makes it possible to render the operation particularly reliable.

According to a further embodiment, the invention relates to a dose. Advantageously, the dose comprises a filtering sheet wherein an internal wall defines an enclosed space for storing a product to be infused, a reinforcement suitable for holding the filtering sheet when bearing on a support.

Preferably, the reinforcement extends essentially in one plane. The dose is preferably symmetric with respect to this plane.

Preferably, the reinforcement is formed from plastic or metal and preferably from cardboard.

Preferably, the reinforcement has a polygonal circumferential border. Such a circumferential border makes it possible not to be salient below the support zones while being simple to manufacture.

Preferably, the reinforcement has a square circumferential border, which allows insertion of the dose regardless of the angular position thereof around the sliding axis.

Preferably, the enclosed storage space has a circular circumferential border, which allows easier and more homogeneous filling of the product to be infused.

According to a further embodiment of the invention, the system comprises a first and a second parts having a relative mobility while translating and defining in part at least one receiving assembly intended to receive the dose prior to the positioning thereof in an infusion position, the system being arranged in such a way that:
  in a first relative position of the first and second parts, the first part forms a receiving surface for a dose introduced into the machine, preferably under the effect of gravity,
  during the relative translation of the first and second parts, the second part forms means for bearing on the dose to induce the sliding of the dose along the first part so as to enable the positioning of the dose in the infusion position, the first part including at least one support zone configured to come into contact with the dose so as to support the circumferential border of the dose so as to block at least partially the weight of the dose in a first relative position of the first and second parts. The system is configured such that the dose slides along this at least one support zone during the relative translation of the first and second parts. The first part also includes at least one axial stop, interconnected with the first part, arranged below said at least one support zone along a projection on a vertical plane perpendicular to the axis of said translation.

Also optionally, the invention further comprises at least one of following optional features:

The system comprises infusion chamber supply means and at least one incoming fluid pipe configured to supply the infusion chamber with fluid to be infused. Advantageously, the first chamber portion, interconnected with the actuator, comprises at least partially said incoming fluid pipe.

the other chamber portion which does not have said incoming fluid pipe is fixed. It is fixed relative to a frame of the machine. The kinematics of the machine is therefore significantly simplified, reliable and robust. Moreover, the actuation of the chamber and the closure device are housed in a small space.

Advantageously, the upstream closure means and the downstream closure means are interconnected with each other. The kinematics of the system is therefore significantly simplified, reliable and robust. In particular, the risks of poor positioning of the upstream closure means relative to the downstream closure means are reduced. Preferably, the closure device is separate from the first and second chamber portions. It is a single piece having the upstream closure means and the downstream closure means.

The hydraulic cylinder and the incoming fluid pipe are arranged on the same side of the infusion chamber.

The hydraulic cylinder comprises a piston and a cylinder defining with the piston a thrust chamber and return means, the hydraulic cylinder being arranged so that the introduction of a pressurized fluid into the thrust chamber causes the deployment of the hydraulic cylinder and so that the return means tend to retract the piston.

The piston comprises a passage communicating on the one hand with the incoming fluid pipe of the first chamber portion, and on the other hand with a supply channel for being connected to a boiler.

The cylinder comprises fitting means interconnected with the cylinder, extending in the thrust chamber, configured to slide within the piston, and housing the supply channel. As such, the supply channel is formed in the fitting means.

The system comprises a receiving surface configured to accommodate a container used for collecting the infused beverage, the second chamber portion being placed between the infusion chamber and the receiving face. Preferably, the infusion chamber comprises two chamber portions, the first being movable and the second being fixed. The second chamber portion is interconnected with a frame of the system. The second chamber portion is made of a thermally insulating material, preferably plastic.

The upstream closure means are interconnected with the downstream closure means.

The system comprises guiding means arranged so as to guide the dose to be introduced into the infusion chamber and to maintain it at a location facing the infusion chamber when the upstream closure means is removed, the guiding means being interconnected with the frame of the machine. As such, with the system according to the invention, the guiding means are not movable. The system complexity is reduced and thus the system reliability is improved. This simplification also tends to reduce the costs of manufacturing and maintenance.

The system comprises a trap door defining an opening placed upstream of the upstream closure means and the closure device comprises obstructing means arranged in such a way as to: leave the opening formed by the trap door unobstructed when the closure device is placed in the first position, and to obstruct the opening of the trap door when the closure device is placed in the second position.

According to another purpose of the invention, a machine for making beverages comprising a system according to any one of the above features.

Figure 9:
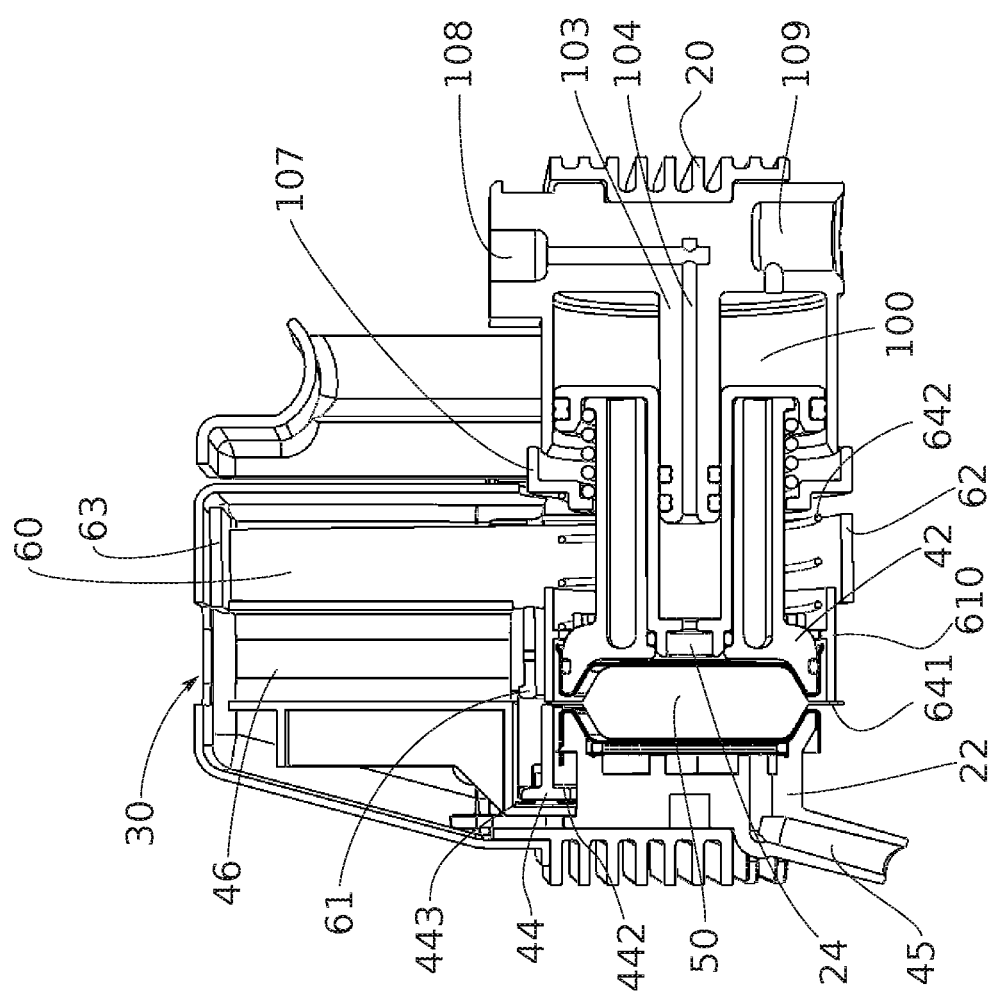
Figure 10:
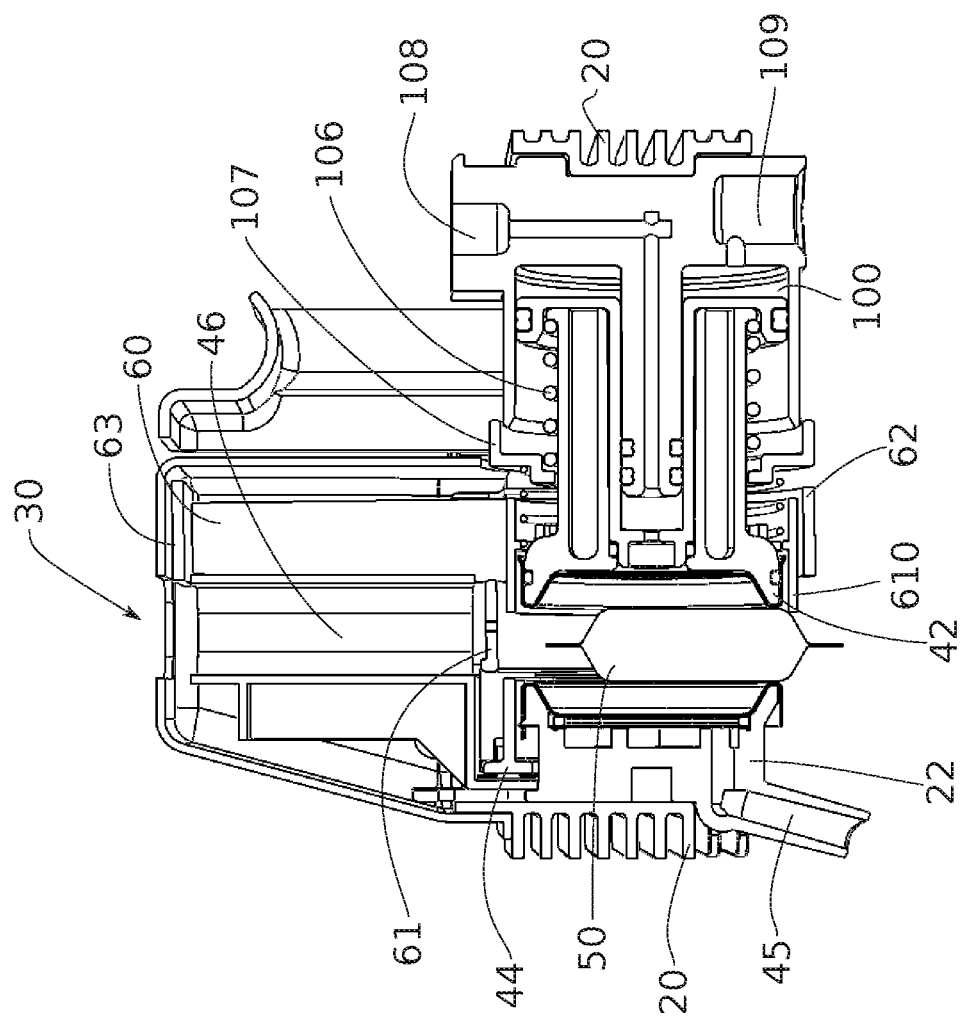
Figure 11:
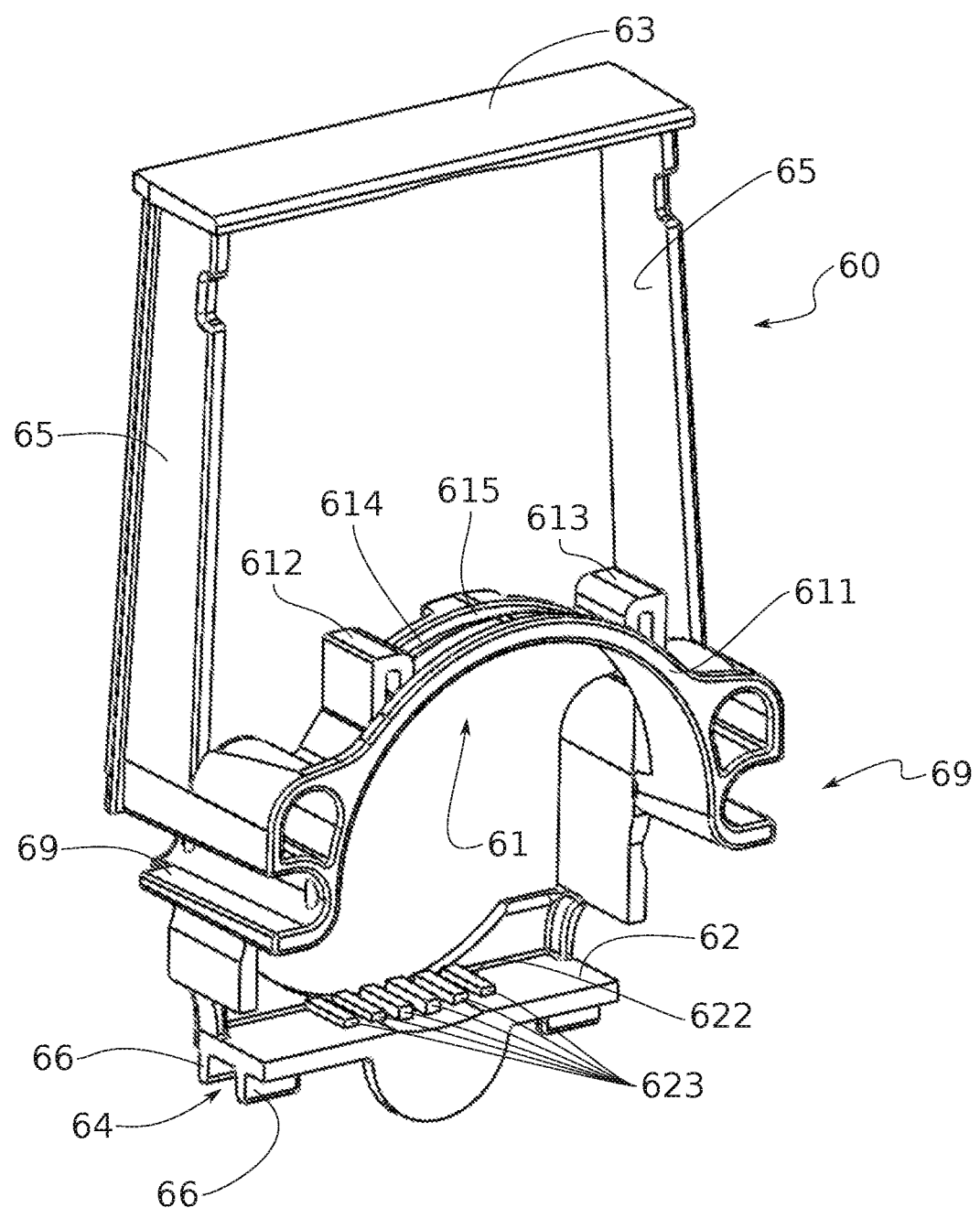
Figure 12:
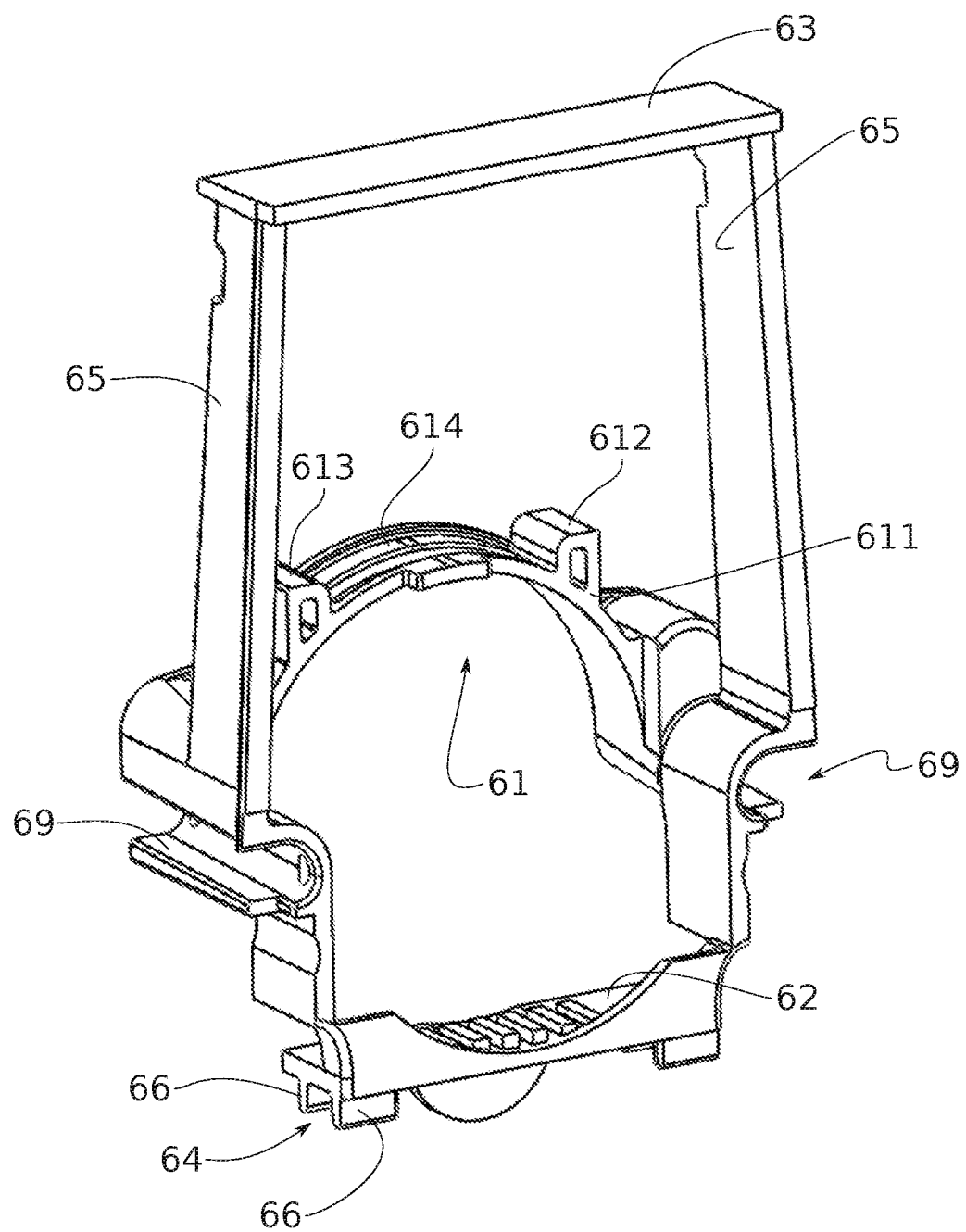
Figure 13:
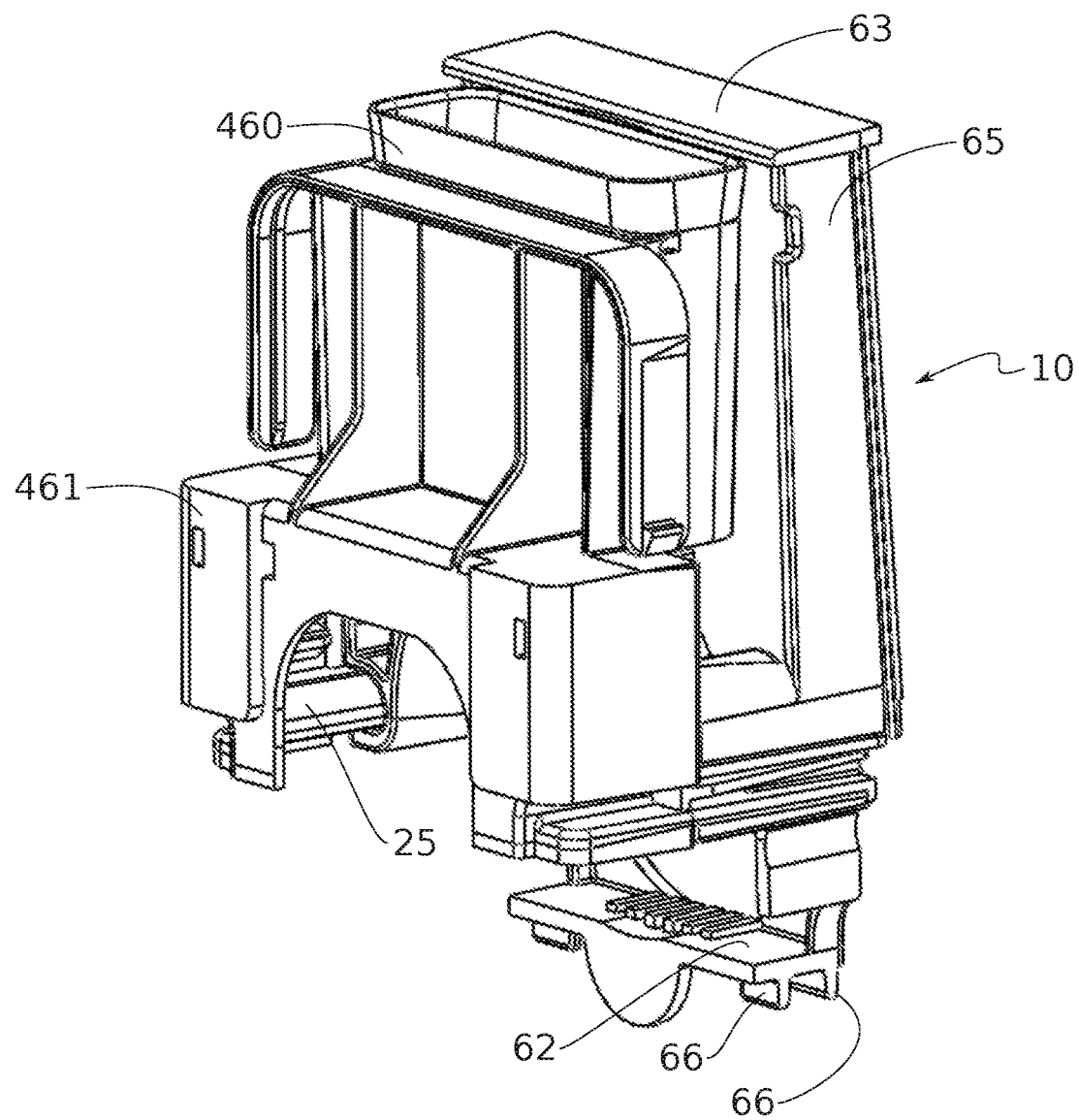
Figure 14A:
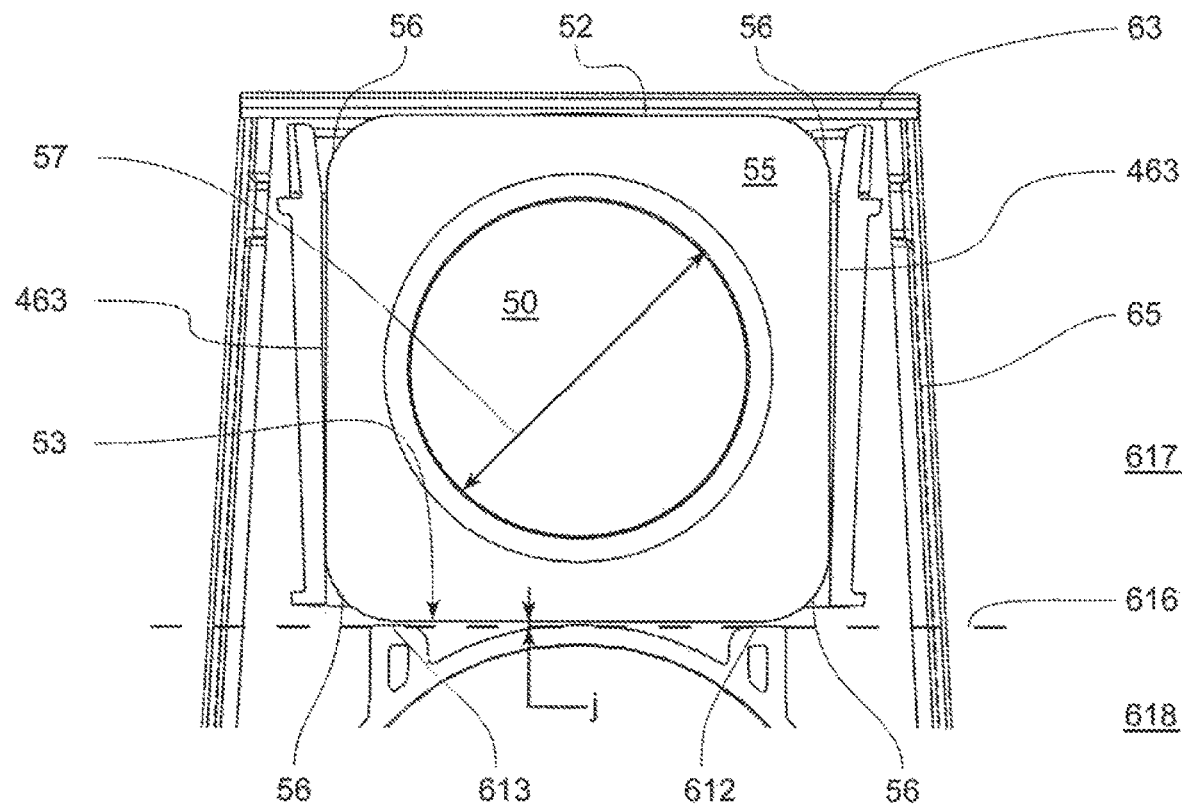
Figure 14B:
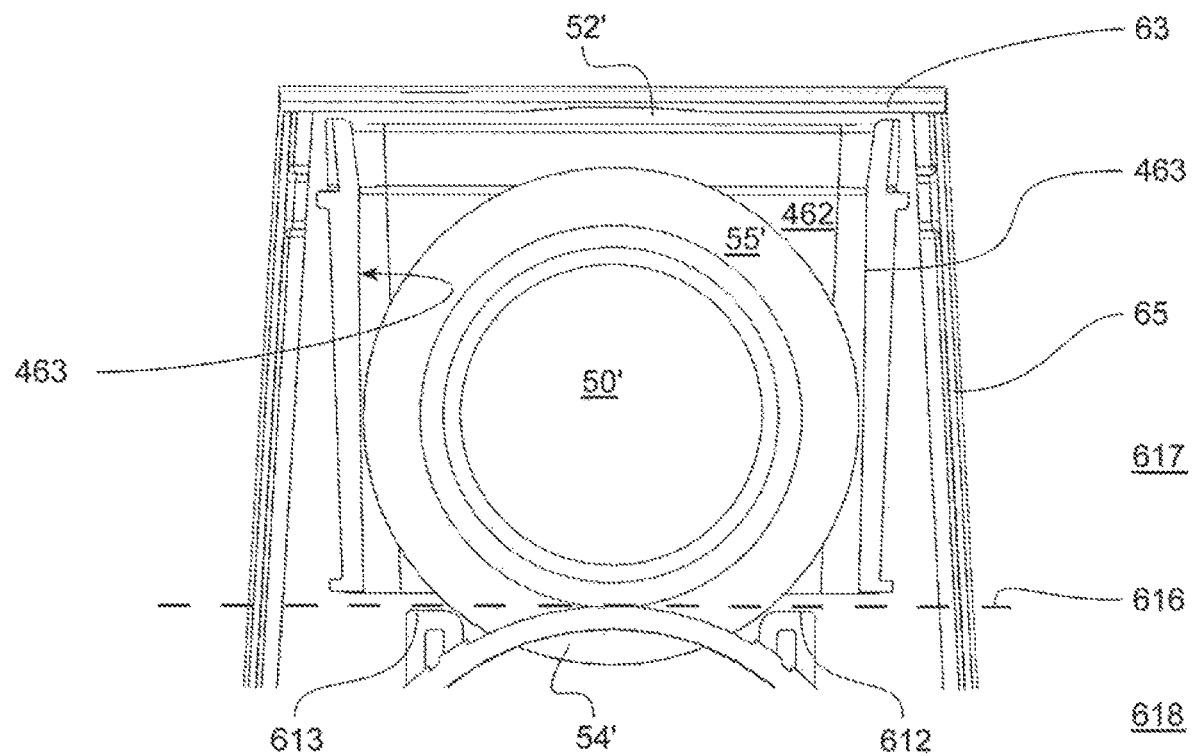
Figure 15A:
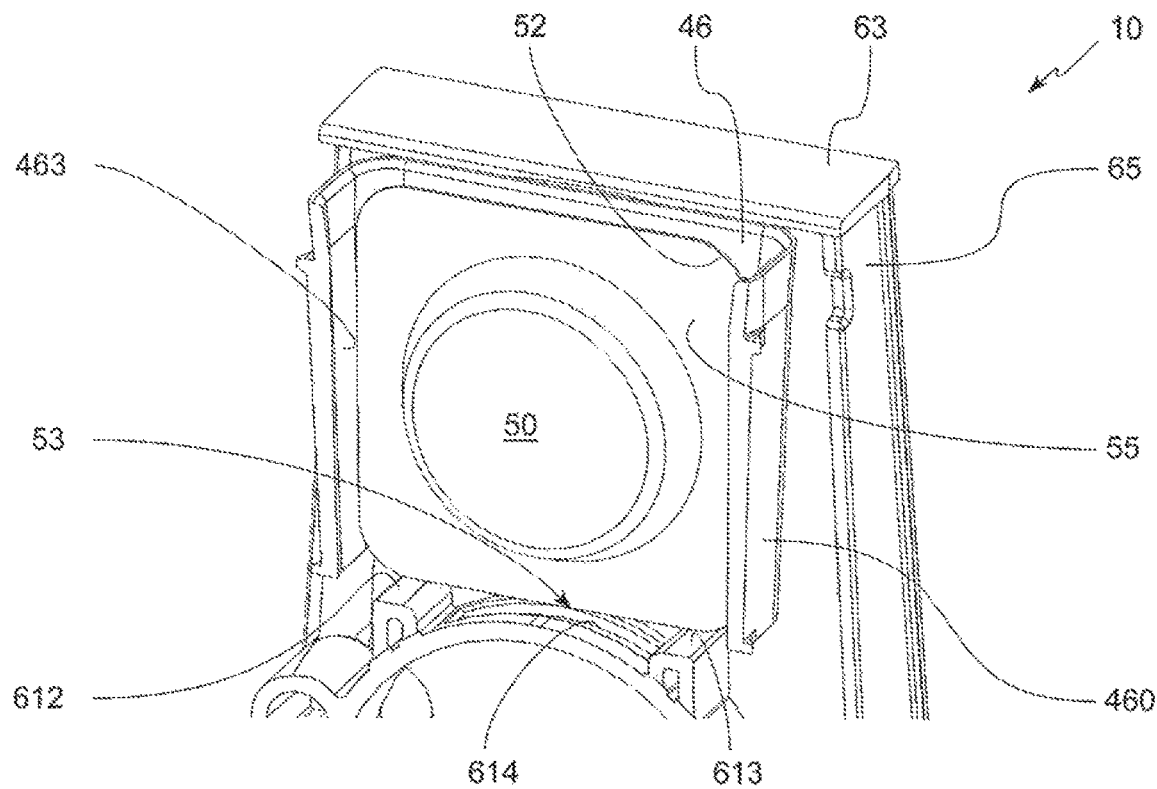
Figure 15B:
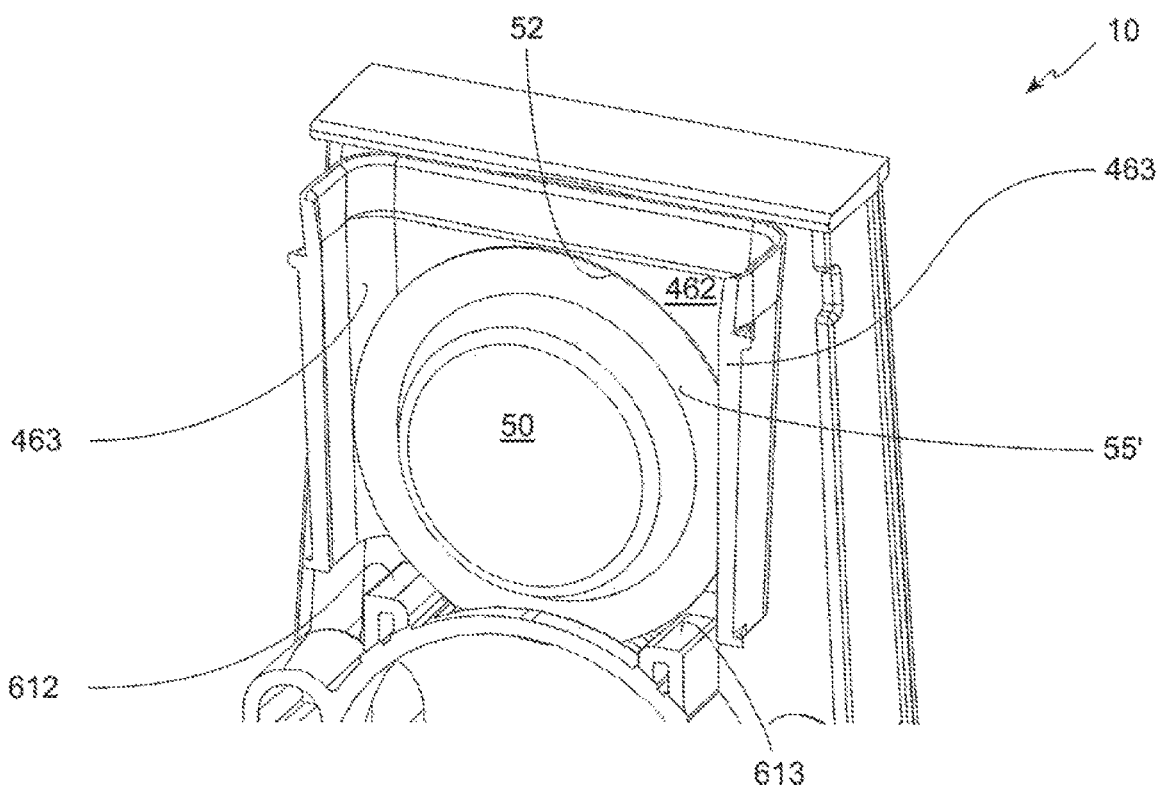
Figure 16A:
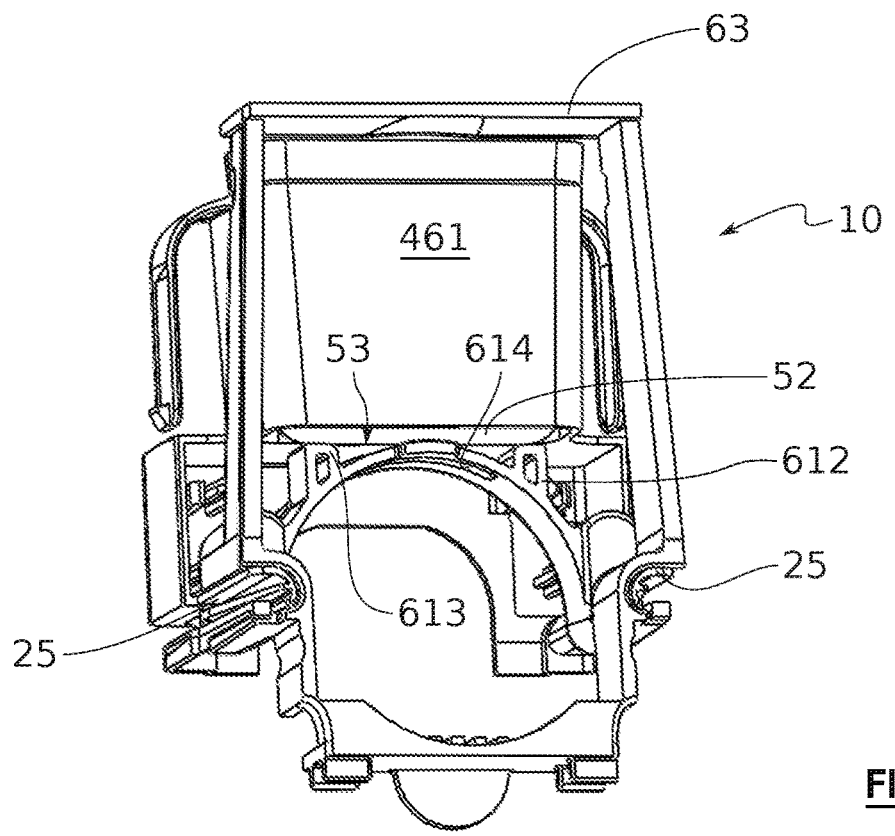
Figure 16B:
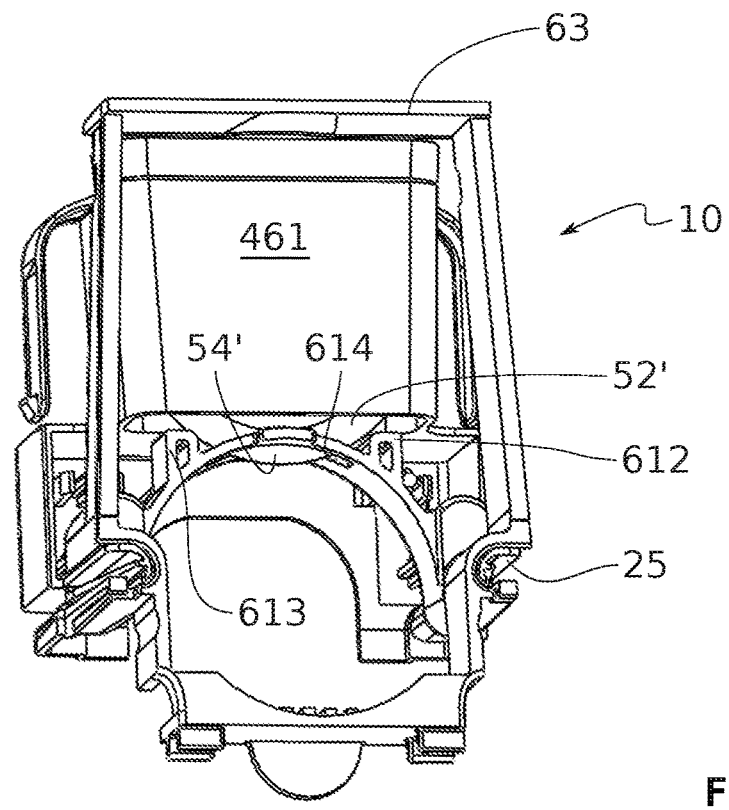
Figure 17:
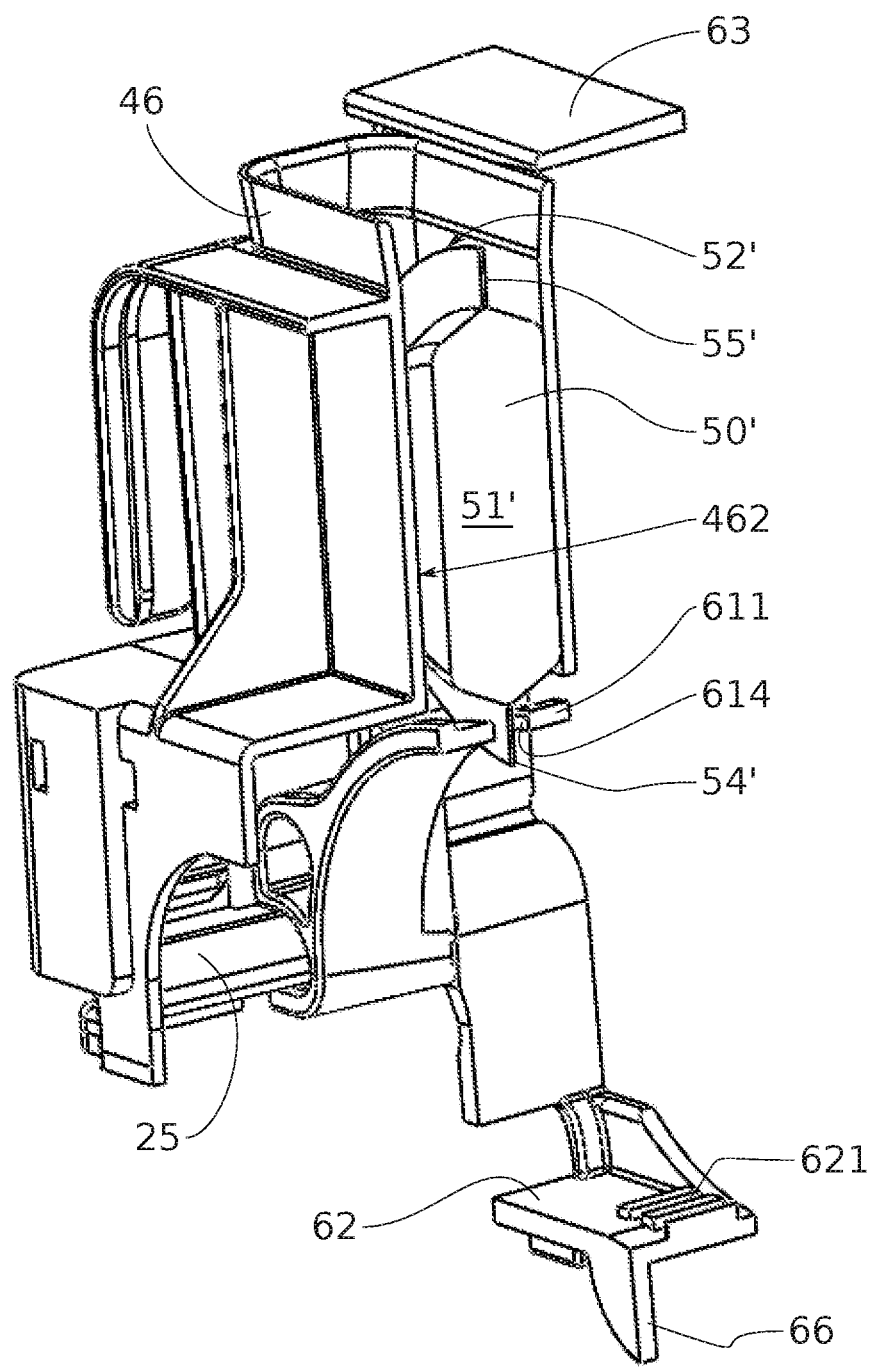

Other characteristics, aims and advantages of this invention will be illustrated in the following detailed description and appended drawings which are given as non-exhaustive examples and wherein:

FIGS. 1 to 10 are longitudinal sectional views of the system shown in FIG. 1 and showing the various stages of the production process during the machine operation, FIGS. 11 and 12 are perspective views of the front and the rear of a part forming closure means according to a particular example of the invention, FIG. 13 shows the sliding of the ring illustrated in FIGS. 11 and 12 along the guiding means, FIGS. 14*a*, 15*a*, 16*a* represent an example of a system according to the invention wherein a dose suitable for this system is inserted, FIGS. 14*b*, 15*b*, 16*b* represent the system in FIGS. 14*a*, 15*a*, 16*a* wherein an unsuitable dose for this system is inserted, FIG. 17 represents a perspective and sectional view of the system in FIGS. 14*a*, 15*a*, 16*a* wherein an unsuitable dose is inserted, FIGS. 18*a* to 18*d* illustrate some steps of the movement of a suitable dose in a system according to the invention, these steps being shown as sectional views, FIGS. 19*a* to 19*d* illustrate some steps of the movement of a suitable dose in a system according to the invention, these steps being shown as perspective and sectional views, FIGS. 1 to 14 illustrate a system 10 for making a beverage according to the invention.

In the present description, we will refer to as upstream and downstream the portions of space that are respectively placed before and after a given point relative to the normal path of a dose in the machine during a preparation cycle for a beverage.

Within the scope of the present invention, doses 50 containing a product to be infused, for example ground coffee, may be used. The product to be infused is enclosed in an enclosed inner volume 51 of the dose. The inner volume is configured to be suitable for being passed by a liquid such as water during infusion. It is for example defined by filtering sheets or by a wall made of a tight material rendered filtering by perforation. The dose comprises a circumferential border 52. Preferentially, the enclosed volume 51 containing the product to be infused has an axial symmetry and the circumferential border 52 is included in a plane perpendicular to the axis of symmetry.

Non-exhaustively, the volume 51 containing the product to be infused consists of the assembly of layers joined by the peripheries thereof at a support reinforcement 55 defining a circumferential border. Advantageously, the present invention can use a variety of doses. In particular, this does not imply that the circumferential border of the dose has to be rigid. It is applied to doses having a flexible or rigid outer shell such as a capsule and more generally to any type of single-use package of product to be infused. It is also applied to doses with outer shells which are capable of disappearing at least partially during the infusion, by dissolving for example. It is also applied to doses formed of a product to be infused, the product being aggregated by a binder and/or by applying a pressure. Such a dose, formed of an aggregate of a product to be infused such as coffee, can be made outside of the machine or be constituted by a dedicated module of the machine.

The system 10 according to the invention includes an infusion chamber 7 intended to receive a dose. The chamber 7 comprises two chamber portions arranged to be moved apart or together in relation to one another by an actuator in order to respectively close or open the infusion chamber 7.

The terms "half chamber" or "chamber portion" are utilized for naming portions capable of being placed in contact with one another or in contact with a dose in order to create a leak-tight volume acting as the infusion chamber 7. The invention does not imply that the two chamber portions present any symmetry with one another.

In the embodiment given as the example, one of the two chamber portions, designated hereafter as a first chamber portion 42 or movable portion, is carried by an actuator allowing the two chamber portions to move closer and away from each other. The other chamber portion, designated hereafter as a second chamber portion or fixed portion 22, is interconnected with a frame 20 of the machine. Each one of the chamber portions has one end that defines a circumferential border contained in a plane that is substantially perpendicular to a longitudinal axis 11.

Hereafter, the longitudinal axis 11 or the longitudinal direction 11 will be designated as the direction comprising the main direction of the actuator 40. A forward direction 12 is the direction along the longitudinal axis 11 along which each of the two chamber portions come together. A backward direction 13 is the direction along this longitudinal axis 11 along which the two chamber portions move apart. The longitudinal direction 11, the forward direction 12 and the backward direction 13 are illustrated in FIG. 1.

In the context of the embodiment shown as an example, the first chamber portion 42 has an incoming fluid pipe 24 connected to fluid supply means which provide fluid, typically hot water, to be infused. Conventionally, the supply means form a hot water circuit comprising a tank, a boiler for heating the water of the tank until the required temperature for its infusion in the infusion chamber 7 is reached, and a pump for increasing the water pressure in the circuit. During infusion, the two chamber portions 42, 22 are kept firmly in contact with one another and define a leak-tight volume for receiving the dose 50. Leak-tightness can be achieved by attaching the circumference of the two chamber portions onto the circumferential border of the dose 50 which then acts as a seal. Leak-tightness can also be achieved or reinforced by using additional sealing means.

The second chamber portion 42 comprises a discharge pipe 45 communicating on the one hand with the inside of the infusion chamber 7, and on the other hand with a beverage discharge outlet. This discharge pipe 45 is designed to discharge the beverage made by infusing the dose 50 and then placed into a container such as a coffee cup.

After infusion, when the first chamber portion 42 has been moved apart from the second chamber portion 22, the infusion chamber 7 is open and the infused dose 50 is no longer enclosed in the infusion chamber 7. This dose 50 is discharged from the chamber 7 by gravity and falls into a collecting tray.

Particularly advantageously, the system is configured such that the means for supplying fluid to the chamber 7 and the actuator of the chamber 7 are arranged on the same side of the chamber 7. Even more advantageously, the supply means and the actuator are arranged to the rear of the chamber 7.

As such, no infusion chamber supply or actuation member needs to be arranged to the front of the second portion 22. This makes it possible to reduce the distance separating the cup from the chamber 7. The heat losses during the delivery of the beverage are thus reduced, and the quality of the resulting beverage is therefore improved. In addition, the repeatability of the quality is improved since the heat losses during the beverage delivery are only slightly different depending on the use of the machine. Furthermore, the size of the machine is reduced.

Preferably, the actuator driving the first chamber portion 42 is a hydraulic cylinder 40. The hydraulic cylinder comprises a piston. The first chamber portion 42 is carried by the piston of the hydraulic cylinder 40. The cylinder of the hydraulic cylinder 40 comprises a base 102 facing the thrust surface 101 of the piston. The base 102 of the hydraulic cylinder 40, the longitudinal walls thereof and the thrust surface 101 define a thrust chamber 100. This thrust chamber 100 is connected to a thrust fluid inlet 109 designed to be connected to the pump. The activation of the pump causes pressurization of the thrust chamber 100, which drives the piston to move towards the front 12 and relatively away from the base 102 of the cylinder.

The system comprises return means of the hydraulic cylinder 40 comprising a return spring 106 configured to ensure the return towards the rear 13 of the piston in a retracted position when the pressure inside the thrust chamber 100 drops. The return spring 103 works in compression and extends longitudinally. Preferably, it is cylindrical and surrounding the piston. It bears upstream on the piston and downstream on a stop 107 which is interconnected with the frame.

The cylinder comprises fitting means 103 salient from the base 102 and extending towards the piston. The piston comprises a housing extending from the thrust surface 101. The housing and the fitting means 103 are arranged so that the fitting means 103 penetrate deep into the housing during the return of the hydraulic cylinder 40 in a retracted position. Regardless of the position of the piston, the downstream end of the fitting means 103 is inserted into the housing of the piston. Seals 110 placed between the piston and the fitting means 103 continuously ensure the leak-tightness of the passage 105.

The fitting means 103 include an inner supply channel 104. An upstream end of the supply channel 104 is fluidly connected to a fluid inlet 108 connected to the boiler. A downstream end comes out into a passage 105 formed by the housing. This passage 105 comes out downstream into the incoming fluid pipe 24 carried by the first chamber portion 42 and supplying fluid to the infusion chamber 7.

Therefore, during the deployment of the hydraulic cylinder 40, the piston moves away from the base 102 of the cylinder and the passage 105 expands. Conversely, the passage 105 becomes shorter when the hydraulic cylinder 40 is retracted. Regardless of the position of the piston, the infusion chamber 7 is always fluidly connected to the supply channel 104.

Advantageously, these fitting means 103 help guide the piston. Preferably, guiding the piston is also provided through the operation between the longitudinal walls of the cylinder and the piston. At least one seal 111 is placed between the longitudinal walls of the cylinder and the piston to ensure the leak-tightness of the thrust chamber 100.

Preferably, the fitting means 103 define a shaft passing through the center of the cylinder.

Closure Device

The system 10 also includes a closure device 60. This closure device 60 includes downstream closure means 62 and upstream closure means 61. It is separate from each of the chamber portions 22, 42 which form the infusion chamber 7.

The downstream closure means 62 are placed downstream of the infusion chamber 7. They are arranged so as to form a retractable stop for a dose 50 being introduced into the infusion chamber 7.

In a non-retracted position, when open, the downstream closure means 62 receive a dose 50 being introduced into the infusion chamber 7 when the latter is open, and prevent this dose 50 falling by gravity towards the downstream of the infusion chamber 7.

In this position, the downstream closure means 62 also prevent any entry into the infusion chamber 7 from the downstream of the latter. Thus, this prevents the user from, for example, inserting fingers into the infusion chamber 7.

In a retracted position, the downstream closure means 62 do not form a stop for blocking a dose 50 introduced in the infusion chamber 7 and allow therefore the dose 50 to drop out when opening the infusion chamber 7.

The upstream closure means 61 are arranged to play a role as retractable stop. They are placed upstream of the infusion chamber 7.

In a non-retracted position, the upstream closure means 61 prevent access to a dose 50 or to any other element in the infusion chamber 7 from upstream of the latter. In this non-retracted position, the upstream closure means 61 also ensure the dose 50 to be received and help to retain the dose 1 in position in the system 10.

In a retracted position, the upstream closure means 61 allow a dose 50 to be inserted into the infusion chamber 7 from upstream of the latter.

The system 10 is arranged to pass the closure device 60 alternately from a first position wherein the upstream closure means 61 prevent a dose 50 from entering the infusion chamber 7, and the downstream closure means 62 ensure that no used dose 50 remains in the infusion chamber 7, to a second position wherein the upstream closure means 61 allow a dose 50 to enter the infusion chamber 7 and the downstream closure means 62 allow the dose 50 to be received and retained in the infusion chamber 7.

The closure device 60 is arranged so that the position of the upstream closure means 61 conditions the position of the downstream closure means 62, and the position of the downstream closure means 62 conditions the position of the upstream closure means 61.

As such, for a given position of the upstream closure means 61, the downstream closure means 62 may only adopt a single position and vice versa. Therefore, the system operates sequentially.

The invention thus reduces significantly the risks of the system jamming, notably due to the dose getting caught up in the mechanical parts. This reduces the number of interventions required by a user or a repairer. It also protects the integrity of the dose 1. Moreover, it prevents a dose introduced into the machine from falling directly into the collecting tray without being first received by the infusion chamber.

The upstream closure means 61 and the downstream closure means 62 are interconnected with each other. This feature simplifies the kinematics, improves sturdiness, limits the fabrication costs and the number of defects of the system 10. The closure device 60 forming a single piece thus defines a ring.

Figure 19D:
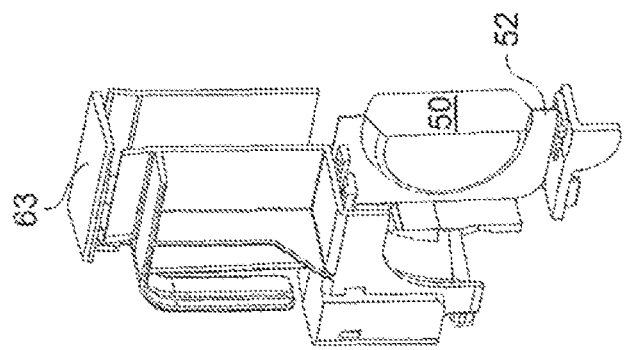
Figure 19C:
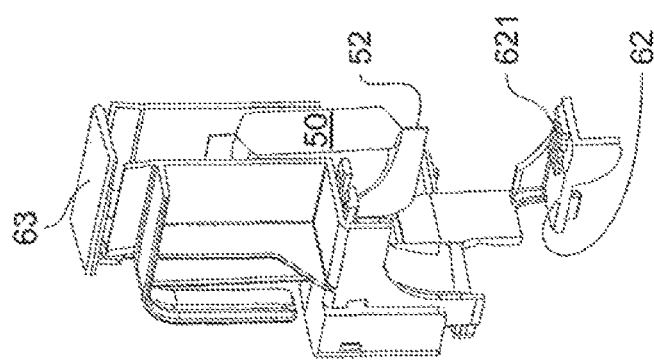
Figure 19B:
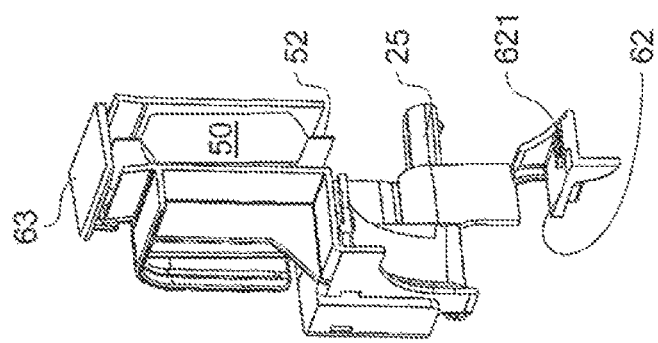

FIGS. 11 and 19*d* detail the closure device 60 according to this embodiment shown as an example. This closure device 60 comprises:

a guide arranged so as to guide the closure device 60 in the alternating movement thereof between the first and the second position. Preferably, the guide comprises two slides 69 capable of guiding the closure device 60 to translate along two shafts 25, 25 carried by the frame 20 of the system 10 and extending along two guiding axes parallel to the longitudinal axis 11, two arms 65, 65 each of which extends from the respective slide 69 thereof in a direction substantially perpendicular to the guidance axis, upstream closure means 61 arranged so as to act as a stop for a dose 50 located upstream of the infusion chamber 7 when the closure device 60 is in the first position. Advantageously, the upstream closure means 61 have the shape of a part of a crown, each end of which joins one of the arms 65, 65 and which is centered on an axis parallel to the guiding axes, downstream closure means 62 arranged so as to act as a stop for a dose 50 located downstream of the infusion chamber 7 when the closure device 60 is in the second position. Advantageously, the upstream closure means 62 have the plane shape extending along a horizontal direction perpendicular to the sliding direction, thus forming two ends, each end of which joins one of the two arms 65, 65 and which is centered on an axis parallel to the guiding axes.

In addition, the upstream closure means 61 and the downstream closure means 62 are arranged so as to be offset relative to one another along the main direction of movement of the closure device 60. As such, in the second position, the upstream closure means 61 are placed substantially in front of the second chamber portion 22, and the downstream closure means 62 are placed substantially behind the second chamber portion 22. In the first position, the upstream closure means 61 and the downstream closure means 62 are placed substantially behind the second chamber portion 22.

The sizes of this offset are selected so that:

when the closure device 60 is in the first position, the upstream closure means 61 prevent a dose 50 from entering the infusion chamber 7, and the downstream closure means 62 allow a used dose 50 to exit the infusion chamber 7, when the closure device 60 is in the second position, the upstream closure means 61 allow a dose 50 to enter the infusion chamber 7, and the downstream closure means 62 allow a dose 50 to be received and held in the infusion chamber 7.

As such, in this example, the closure device 60 being slidably mounted along the longitudinal axis 11, the upstream 61 and downstream 62 closure means have a mutual offset along the longitudinal axis 11. The upstream closure means 61 are placed in front of the downstream closure means 62 along this same axis.

The system 10 comprises actuating means allowing alternation of the passage from the first position to the second position. These are the same actuating means that act on both the upstream closure means 61 and the downstream closure means 62.

Consequently, the system 10 considerably reduces the risks of the packages jamming in the mechanism.

The reduced number of actuators significantly limits the complexity of the structure of the system 10. This structure allows the kinematics of the members for passing alternately from the first to the second position to be simplified.

At least one expanding spring, working preferably in compression, tends to push the closure device 60 towards the first chamber portion 42 of the infusion chamber 7 and to approach the closure device 60 to the head of the hydraulic cylinder 40. The expanding spring thus repels the closure device 60 towards the rear 13.

Preferentially, the expanding spring shall be sized so that the jamming of the dose 50 between the closure device 60 and another element of the system 10 does not interfere with the integrity of the dose 50. As such, for example a spring applying, on the closure device 60, a force equivalent to the total weight of the dose 1 plus the weight of the closure device 60 increased at least by a third of said total weight will be chosen. The elastic force of the spring is thus between 0.6 and 1.5 Newton.

Preferentially, the closure device includes two housings 47, 47. Each housing 47 is configured to accommodate an expanding spring. These housings 47 are shown in FIG. 11. The system is arranged so that each of the expanding spring bears on the one hand on a base of the housing 47, and on the other hand on a wall connected to the frame 20.

The front end of the shafts 25, 25 is connected to the frame 20.

The forward movement of the closure device 60 and the engagement of movement of the closure device 60 in one direction or in the other direction will be described in detail in the following paragraphs.

The closure device 60 is driven by a drive device (not shown). This drive device comprises for example at least one drive finger cooperating with an end of travel stop 66 carried by the closure device 60.

Preferably, as illustrated in FIGS. 11 to 19*d*, the closure device 60 comprises a pair of end of travel stops 66, 66 distributed on each side of the axis of movement. Each pair of end of travel stops 66, 66 is configured to accommodate a drive finger. The longitudinal movement of the drive finger 60 drives the closure device 60 in translation.

The system 10 also includes a guiding means 46. These guiding means 46 have substantially the shape of a sleeve which is complementary to the shape of the section of the dose 50. They are arranged so as to prevent any significant movement of the dose 50 in the horizontal plane and allow the vertical movement thereof. They act as a hopper.

According to the embodiment illustrated, these guiding means 46 are interconnected with the frame 20. They are thus fixed. Preferably, they are mounted on the second chamber portion 22 or on a piece interconnected with the latter or with the frame 20. They are arranged so as to guide the dose 50 located upstream of the upstream closure means 61. They thus have two lateral guiding surfaces 463 which limit the movement of the dose in a plane perpendicular to the translation axis 11.

Moreover, these guiding means 46 are placed longitudinally so as to be positioned opposite the opening of the infusion chamber 7 in the second position in order to allow the insertion of the dose 50 into the latter when the upstream closure means 61 are retracted. More precisely, they are positioned opposite the downstream closure means 62 when the latter are in the second position. They thus guide the dose 50 as it moves down to the infusion chamber 7.

In addition, they are placed vertically so as to be close enough to the upstream closure means 61 in order to ensure that the dose 50 is retained when the latter rests on the upstream closure means 61. As such, when a dose 50 rests on the upstream closure means 61 and the latter translate forwards, the guiding means 46 help prevent any significant longitudinal translation of the dose 50. For this purpose, they have a bearing surface 462 arranged to bear on the dose. In the embodiment illustrated, the closure means 60 slide with respect to the guiding means 46, the bearing surface 462 then blocks the sliding of the dose along the longitudinal axis 11. The bearing surface 462 is for example illustrated in FIGS. 18*a* to 18*d*.

The latter is thus held facing the opening of the infusion chamber 7 when the upstream closure means 61 are fully retracted. The relative movement of the closure device 60 and the guiding means 46 thus enables the transfer of the dose 50 from the upstream closure means 61 to the chamber 7. Moreover, this relative movement makes it possible to protect the integrity of the dose 50 during this transfer. This guiding of the dose is clearly illustrated in FIGS. 1 to 4 and will be described in more detail with reference to FIGS. 18*a* to 19*d*.

By providing the fixed guiding means 46, the invention helps enhance the robustness and reliability of the system while maintaining the sequential nature of the operation.

In one alternative embodiment not illustrated where the guiding means 46 slide with respect to the fixed closure means 60, the bearing surface 462 pushes the dose along the longitudinal axis 11 and slides it along the part 661 forming the upstream closure means 61.

These guiding means 46 maintain a dose 50 in position resting on the upstream closure means 61 so as to facilitate the insertion of this dose 50 in the chamber 7. Optionally, the guiding means 46 have two substantially parallel and vertical grooves intended to engage with the circumferential border of the dose 50 in order to help guide the latter.

Particularly advantageously, the upstream closure means 61 form a first part 611 having means for receiving the dose. Typically, the upstream closure means 61 have at least two support zones 612, 613 arranged to receive a portion of a dose 50 suitable for the system and advantageously the circumferential border 52 of such a dose. These two support zones 612, 613 preferably define together a preferentially horizontal plane 616. It may consist for example of two edges arranged parallel to the translation direction 11. According to the example illustrated, these two support zones 612, 613 each form a plane. The upstream closure means 61 then define a plane 616 and two space portions 617, 618 situated above and below the plane 616, respectively, along a vertical direction. The planes 616 and the space portions 617, 618 are for example illustrated in FIGS. 14*a* and 14*b*. If the dose is suitable for the machine, it typically rests by the circumferential border 52 thereof on the support zones 612, 613.

The upstream closure means 61 also define a space, also known as an opening, situated between the two support zones 612, 613 and configured to allow the entry of a dose

50' or by the circumferential border of such a dose when this dose 50' rests on the upstream closure means 61 and this dose is not suitable for being used with the system. This opening defines a slot 614 on the embodiment illustrated, which particularly can be seen in FIGS. 11, 12 and 15a, 16a, 17 and 18a to 19d. This slot 614 extends essentially along a transverse direction with respect to the longitudinal sliding axis 11.

The dose once inserted into the machine and before it is placed in the position provided for infusion is thus situated partially at least in the upper space portion 617. If the dose is suitable for the system, as is the case with the dose 50 illustrated in FIGS. 14a, 15a, 16a and 18a to 19d, the dose 50 does not enter the opening. It is preferably entirely positioned in the space portion 617 situated above the plane 616. The reinforcement 55 or more generally a portion of the circumferential border 52 of the dose rests on the support zones 612, 613.

Typically, this dose 50 has at least one rectilinear circumferential border portion 52 at the very least on a portion defined by two zones each intended to bear on a support zone 612, 613. This rectilinear circumferential border portion 52 intended to be positioned between the two support zones 612, 613 and referenced 53 in FIGS. 14a, 15a, 16a. Preferably, the dose 50 has a circumferential border having a polygonal shape. Preferably, the circumferential border 52 is square, which enables independent operation of the direction of insertion of the dose 50 around the direction of sliding thereof in the system.

If the dose is not suitable for the system, as is the case with the dose 50' illustrated in FIGS. 14b, 15b, 16b and 17, this dose 50' enters the opening. As such, it is partially situated in the space portion 617 situated above the plane 616 and partially situated in the space portion 618. In the example illustrated, the reinforcement 55' of the dose enters the opening defined by the slot 614. The dose portion 50' entering the opening, typically the slot 614, is referenced 54' in the figures.

The upstream closure means 61 also comprise at least one member forming an axial stop 615 for a dose 50' wherein a portion is brought into contact with the axial stop 615 when sliding the dose. Preferably, a part of this dose 50' enters the space portion situated below the plane 616 defined by the bearing surfaces 612, 613. The system is configured in such a way that, during the relative sliding of the upstream closure means 61 with respect to the guiding means 46, the axial stop 615 comes into contact with the portion 54' of the dose 50'. The axial stop 615 then blocks the relative movement of the dose 50' with respect to the upstream closure means 61. As the dose 50' remains bearing on the guiding means 46 without any possibility of sliding with respect to the latter, the upstream closure means 61 are then blocked with respect to the guiding means 46.

Any relative sliding is then prevented. The system is blocked and the beverage cannot be prepared. The invention thus makes it possible to prevent particularly effectively and simply a dose 50' that is unsuitable for the machine from being used therein.

Advantageously and as detailed hereinafter, the system slaves the operation of the pump to the movable part (the upstream closure means 61 in the example illustrated) with respect to the frame.

In the example illustrated, where the opening is formed by a slot 614, the axial stop 615 is formed by an outline or an edge of the slot 614. This axial stop 615 is referenced in FIGS. 11, 18a and 18b. It is limited by the outline of the opening which is positioned most downstream along the relative sliding direction of the upstream closure means 61 with respect to the guiding means 46.

In the embodiment illustrated, the two support zones 612, 613 are salient on the main shape of the first part 611, in the example illustrated a part of a crown of the upstream closure means 61.

According to one advantageous embodiment, the support zones 612, 613 are configured to define a play "j" between the plane 616 defined thereby and the axial stop 615. This play "j" is illustrated in FIG. 14a. This play makes it possible to ensure that a dose 50 suitable for the system does not come into contact with the axial stop 615 even if it has some manufacturing defects. Typically, the play "j" is of the order of 0.5 to 5 mm.

In FIGS. 14a, 15a and 16a, it is seen clearly that the dose 50 is retained by the support zones 612, 613. It does not enter the slot 614 and thus is not positioned facing the axial stop 615 along the longitudinal axis 11.

In FIGS. 14b, 15b 16b and 17, the dose 50' that is unsuitable for the system, enters the slot 614. The vertical movement thereof is interrupted by the contact with the circumferential border of the slot 614 as illustrated in these figures or by contact between the circumferential border 52' thereof and the support zones 612, 613. Regardless of the manner wherein this dose 50' that is unsuitable for the system is retained by the upstream closure means 61, the dose 50' is positioned facing the axial stop 615 along the translation direction 11.

Non-limiting examples of doses suitable for a system according to the invention will now be described in more detail.

The dose 50 forms a package including a first coating and a second coating assembled at the periphery thereof in a joint face so as to define a volume 51 for receiving the substance for making a beverage. Preferably, the assembled peripheries of the first and second coatings define a peripheral reinforcement 55 wherein the external outline or circumferential border 52 has a substantially rectangular profile.

Preferably, the substantially rectangular profile includes a connection fillet at each of the corners thereof, which makes it possible to reduce the risks of involuntary catching of the circumferential border in the machine. Preferably, the connection fillets 56 are arc-shaped.

Preferably, the substantially rectangular profile is substantially square and the length of one side is between 5 cm and 5.5 cm. Preferably, the peripheral portion has a width of 0.5 cm. Preferably, the device contains between 9 and 15 grams of ground coffee.

Preferably, at least one among the first and second coatings includes a layer based on filter paper.

Preferably, the assembled peripheries of the first and second coating define a peripheral portion further comprising a reinforcement, the reinforcement covers the entire surface of the peripheral portion.

Preferably, the dimension separating the enclosed storage space and the circumferential border is less than 15 mm, preferably less than 10 mm and preferably less than 5 mm.

According to a first embodiment illustrated in FIGS. 14a and 15a in particular, the receiving volume has a substantially circular cross-section, along a plane parallel with the joint face.

Preferably, the diameter 57 of the circular cross-section is between 30 and 35 mm and preferably between 35 and 45 mm and preferably between 38 and 42 mm.

Preferably, the dimension separating the enclosed storage space and the circumferential border is less than 15 mm, preferably less than 10 mm and preferably less than 5 mm.

Preferably, the substantially rectangular profile and the substantially circular cross-section have the same center.

According to a further embodiment not illustrated in the figures, the receiving volume has a substantially square cross-section, along a plane parallel with the joint face.

Preferably, each side of the circumferential border is parallel with a side of the cross-section of the receiving volume.

Preferably, the peripheral portion has a substantially constant width around the receiving volume.

Preferably, the substantially rectangular cross-section includes a connection fillet at each of the angles thereof.

Preferably, the connection fillets are arc-shaped.

Preferably, the arc has a radius of the order of 0.5 cm.

Preferably, the substantially rectangular cross-section is substantially square and the length of one side is between 4.5 cm and 5 cm.

Preferably, the substantially rectangular profile and the substantially rectangular cross-section have the same center.

The system 10 also comprises a trap door 30 forming an opening placed upstream of the upstream closure means 61 and upstream of the guiding means 46. The opening of the trap door 30 is placed longitudinally so that it is positioned opposite the guiding means 46. Hence, they are positioned opposite the upstream closure means 61 when the closure device 60 is in the first position. The opening formed by the trap door 30 can be accessed by a user and is designed to receive and introduce a dose 50 into the system 10.

The guiding means 46 are fixed relative to the trap door 30. The invention eliminates any risk of jamming of a dose or any other object such as a finger between the guiding means 46 and the trap door 30.

The closure device 60 comprises obstructing means 63 arranged so that:
  the opening of the trap door 30 is obstructed when the closure device 60 is in the second position,
  the opening of the trap door 30 remains free when the closure device 60 is in the first position.

Advantageously, the closure device 60 is formed from a single piece of material. The closure device 60 may for example be made of aluminum, stainless steel or plastic.

As mentioned previously, the system 10 has a pump that is designed to supply fluid to the infusion chamber 7. Moreover, in the particular example described, this pump also supplies the actuator making it possible to close and open the chamber 7. Indeed, the pump supplies a hydraulic circuit actuator of the hydraulic cylinder 40.

The pump is supplied with electricity from an electrical circuit equipped with a first and the second switch.

The first switch closes on an order from an user. Advantageously, a control button is connected to the first switch and when operated closes it.

The second switch closes when the closure device 60 is placed in the second position. More precisely, the system 10 comprises slaving means arranged so as to operate the pump based on the position of the closure device 60.

The slaving means are configured to prevent the pump from operating when an obstacle in the lower part of the system 10 prevents the closure device 60 from adopting a correct position. As such, when a dose 50' that is unsuitable for the machine is introduced into the system and when the collecting tray is full and a dose 50 which has been infused cannot be correctly ejected and prevents proper operation of the closure device 60, the pump is unable to operate and the alarms may be activated. The same applies if a user inserts fingers through the downstream opening of the chamber. The hot water is not delivered to the chamber and the hydraulic cylinder is not actuated. The risk of burning or pinching fingers is avoided even in case of abnormal use of the system.

Furthermore, the invention also makes it possible to protect the integrity of a dose 50 present in the infusion chamber 7 when the closure device 60 is blocked. Indeed, operating the pump would lead to the dose 50 being crushed and wetted.

The sequence of operations for preparing a beverage will be described below based on FIGS. 18a to 19d.

Figure 18D:
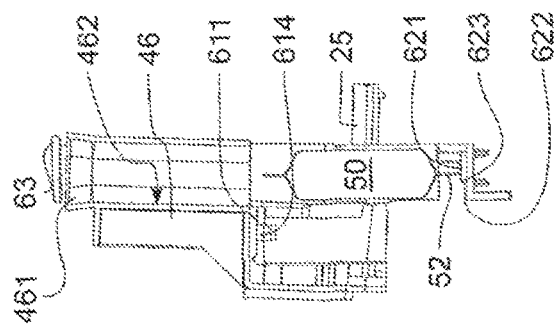
Figure 18C:
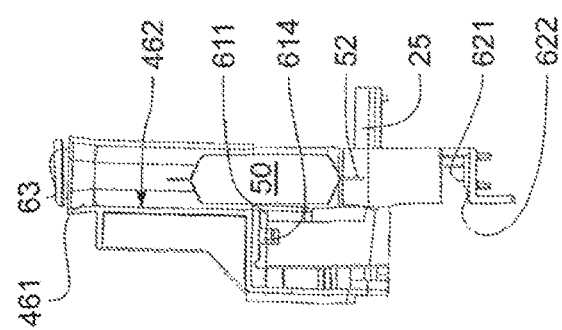
Figure 18B:
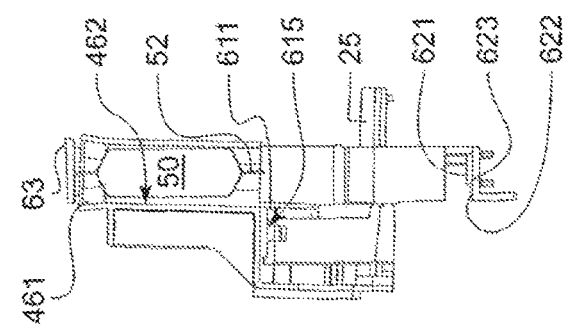
Figure 18A:
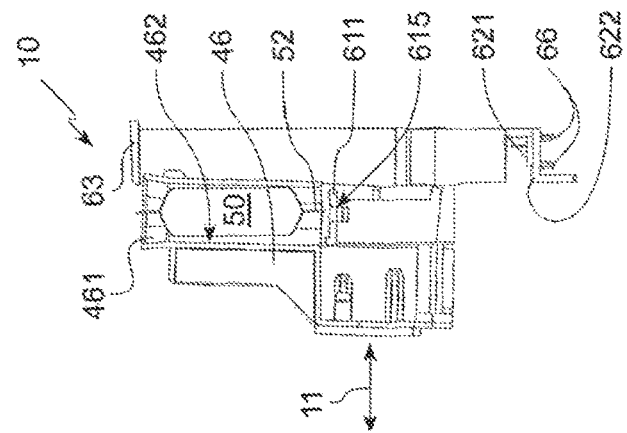
Figure 19A:
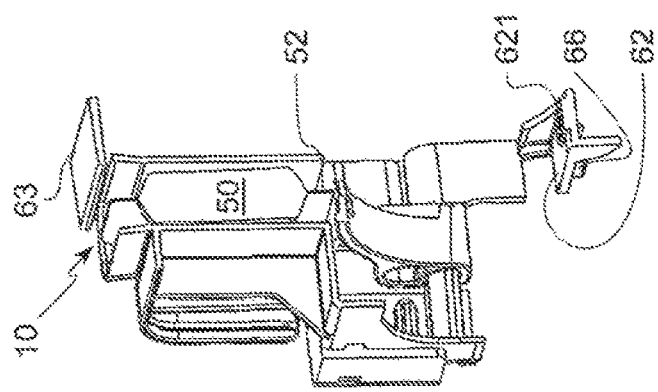

The user inserts a dose 50 in the opening of the trap door 30. This dose 50 falls by gravity while being guided and then maintained in a substantially vertical position by the guiding means 46, typically by the guiding surfaces 463, the bearing surface 462 and by the wall forming a surface opposite the bearing surface 462. The fall of this dose 50 is stopped by the upstream closure means 61 positioned opposite the opening of the trap door 30 and the guiding means 46. These upstream closure means 61 prevent the package 1 from entering the infusion chamber 7. This step is illustrated in FIGS. 18a and 19a.

In the example illustrated, the dose 50, when resting on the bearing portions 612, 613, has no portion suitable for entering the opening formed by the slot 614.

In a subsequent step illustrated in FIGS. 18b, 18c and 19b, 19c, the user controls the actuation of the closure device 60. The latter is then free to slide forward under the force exerted by the drive device (not shown) acting on the end of travel stops 66, 66. During this movement, the upstream closure means 61 move forwards and the guiding means 46 remain fixed to the frame, thereby maintaining the dose 50 opposite the opening of the infusion chamber 7. Progressively as they move forward, the upstream closure means 61 free the opening of the infusion chamber 7. Moreover, the downstream closure means 62 progressively obstruct the opening of the infusion chamber 7 downstream thereof. When the opening of the infusion chamber 7, now disengaged by the upstream closure means 61, has become large enough, the dose 50 falls by gravity into the infusion chamber 7 where it is received by the downstream closure means 62 forming a stop. This step is illustrated in FIGS. 18c, 18d and 19c, 19d.

Preferably, the downstream closure means 62 have a receiving surface 622 whereon the circumferential border of the dose 50 is intended to fall upon the arrival thereof on the downstream closure means. The downstream closure means 62 also comprise a stripping member 621 salient from the surface of 622. The salient portion defines an axial stripping stop 623 facing the dose 50 when the latter is resting on the surface 622. The machine is arranged such that the fixed chamber and the receiving surface 622 are arranged on either side of the axial stripping stop 623. As such, when the dose rests on the receiving surface 622, one side of the dose is opposite both the fixed chamber and the axial stop 623.

As such, after infusion and during the separation of both chambers, if the dose tends to remain attached to the fixed chamber, then the distancing of the ring along the direction 11 distancing the removal of the receiving surface 622 and the axial stripping stop 623 relative to the fixed chamber; the axial stripping stop 623 then comes into contact with the circumferential border of the dose 50 and moves it away from the fixed chamber. The dose is then detached from the fixed chamber and can be removed from the infusion group.

This solution proves to be particularly robust and enhances the reliability of the machine.

The forward movement of the closure device 60 continues until the closure device 60 comes into and stops with an element of the frame 20. This step is illustrated more particularly in FIGS. 19c, 19d. In this position, the closure device 60 is placed in the second position. In this position:

the upstream closure means 61 allow access to the infusion chamber 7 from upstream of the latter, the downstream closure means 62 receive the dose 50 introduced into the infusion chamber 7, the obstructing means 63 obstruct the opening to the trap door 30, thereby preventing packages or any other object from entering through this opening, an electrical contactor interconnected with the frame is in contact with a contact finger actuated by the ring and the slaving means enabling the operation of the pump.

Figure 6:
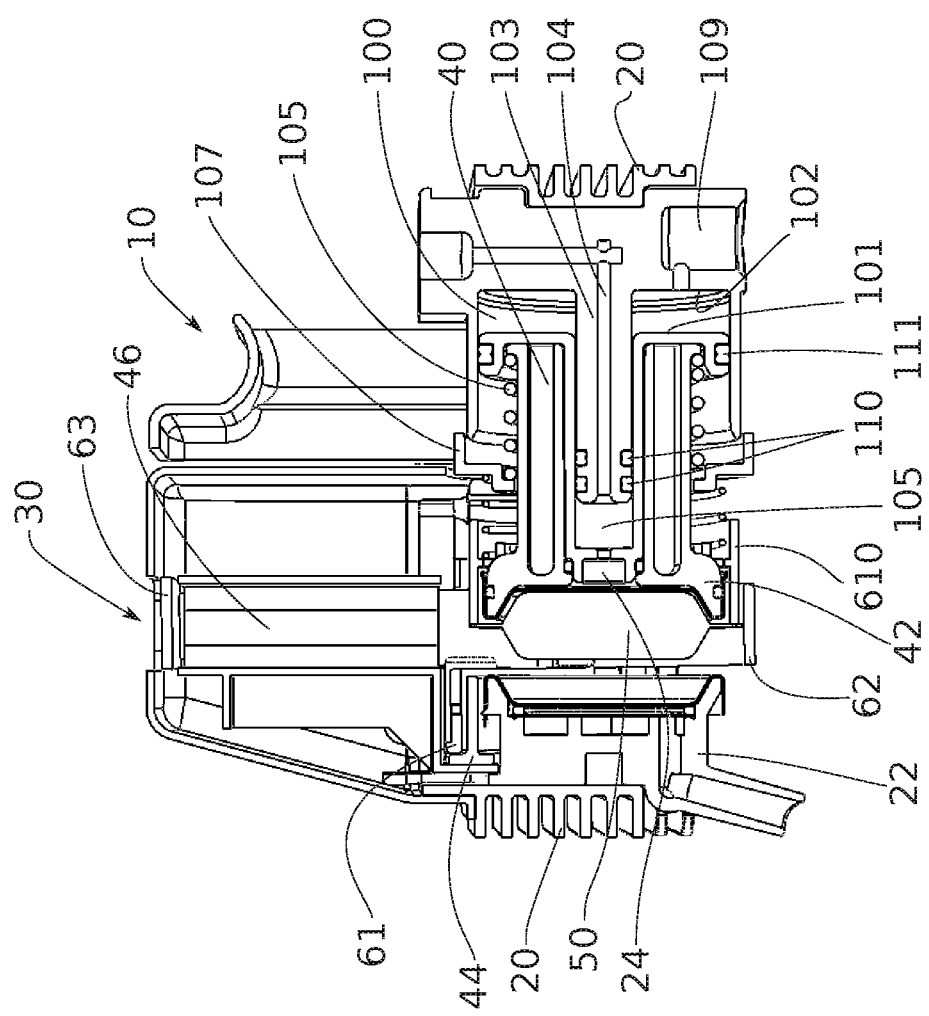
Figure 7:
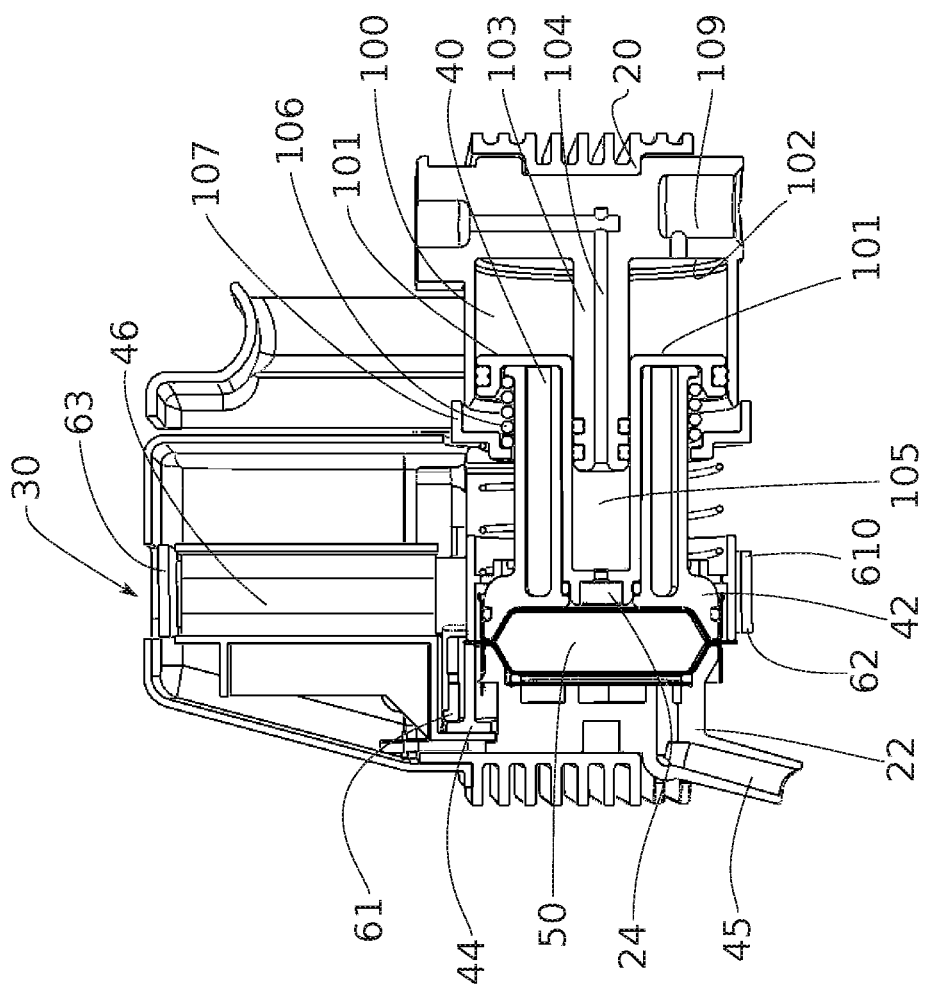

The pump supplies fluid to the thrust chamber 100 through the inlet 109. A thrust force is applied to the thrust surface 101 of the hydraulic cylinder 40, which retracts the return spring 106 and drives the head of the hydraulic cylinder 40 to move forwards, as illustrated in FIG. 6. This movement continues until the two chamber portions 24, 42 form a sealed volume enclosing the dose 50 as illustrated in FIG. 7. The water heated by the boiler and flowing from the tank enters the infusion chamber 7. The infusion chamber 7 is therefore closed successively by the infusion fluid inlet 108 and the supply channel 104 and the passages 105 and 24 enabling infusion of the dose 50. The discharge pipe 45 borne by the second portion 22 makes it possible to extract the beverage to the container.

Figure 8:
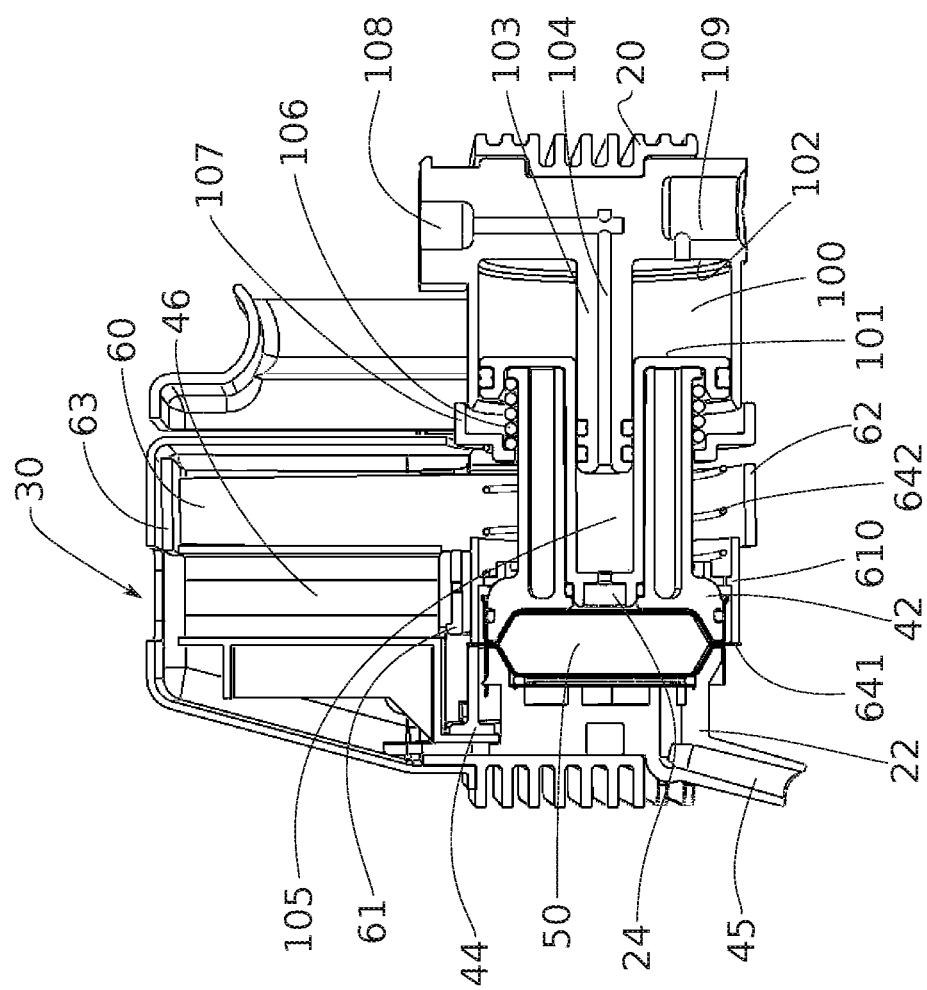

Once the infusion is complete, the drive device (not shown) acting on the ends of travel moving stop 66, 66 allows to withdraw it towards the rear of the closure device 60. The closure means return to the first position which thus makes it possible to remove the dose 50 from the chamber 1. This step is illustrated in FIG. 8.

The head of the hydraulic cylinder 40, under the effect of the return spring 106 acting in compression, starts to be withdrawn backwards, as shown in FIG. 9.

The dose 50 is then positioned between the two chamber portions without being interconnected with either of them.

The two chamber portions 22, 42 are cup-shaped and substantially guide the dose 50 toward the opening of the infusion chamber 7 when they move apart. The closure device 60 is returned to the first position: the downstream closure means 62 no longer prevent the ejection of the dose 50 and the latter can then fall by gravity toward the collecting tray of the infusion chamber 7. This step is illustrated in FIG. 10. Moreover, the obstructing means 63 leave the opening of the trap door 30 unobstructed and a new dose 50 can be inserted into the system 10.

Advantageously, the present invention operates sequentially and this improves significantly the beverage quality, the reliability of the existing systems, reduces the risks of the mechanism jamming and protects package integrity.

Many variants can be made to the previously described device without leaving the scope of the invention.

In particular, the closure device 60 can be arranged to translate along a main direction different from that of the longitudinal axis 11, such as for example a vertical axis or a horizontal axis perpendicular to the longitudinal axis 11. For such a closure device 60, the upstream closure means 61 and the downstream closure means 62 of such a device are shifted along this main direction.

The closure device 60 can be actuated by an electric motor or manually.

The system 10 described above is adapted to packagings which are different from the packaging shown in the figures, and such adaptation can be easily performed by changing the sizes and the configuration of the upstream downstream closure means 61 and the downstream closure means 62, the guiding means 46, the opening of the trap door 30 and the two chamber portions 22, 42.

The present invention is not limited to the embodiments described above, and can be applied to all embodiments within the spirit and scope of the present invention.

The invention is particularly applied to the systems wherein the closure device includes only downstream closure means, without the existence of the upstream closure means. It is also applied to the systems wherein the position of the downstream closure means does not condition the position of the upstream closure means and vice versa.

The invention is applied to systems wherein the supply channel of the infusion chamber can be borne by the movable chamber as in the example illustrated in FIGS. 1 to 10. The invention is also applied to systems wherein the supply channel is borne by an element of the frame or by the fixed chamber portion 22.

In the example illustrated and described in detail, the guiding means 46 are fixed with respect to the frame and the upstream closure means 61 are movable with respect to the frame.

The invention is also applied to systems wherein the upstream closure means 61 are fixed with respect to the frame and the guiding means 16 are movable with respect to the frame. As such, the bearing surface 462 is movable in translation. The bearing zones 612, 613 are then fixed and each form for example a rail whereon the dose 50 slides while being actuated by the movement of the bearing surface 462 borne by the guiding means 46.

The invention is applied to any type of bearing surface 462.

As an alternative to the salient portions forming the support zones 612, 613 illustrated in FIGS. 13 to 19d, it can be envisaged that these support zones are formed by a single plane surface having an opening arranged to allow an unsuitable dose 50' to enter. This opening may not be a slot and may not have a closed outline.

The axial stop may be formed by any type of member suitable for coming into contact with the dose 50' to block the axial sliding thereof.

The invention is not limited to operation with square doses. It is arranged to enable the preparation of a beverage and the operation of the system with any dose not having a portion positioned opposite the stop along an axial direction when this dose rests on the upstream closure means 61.

Furthermore, the invention makes it possible to prevent the use of the machine with an unsuitable dose by blocking the progression of the dose 50' even if the latter does not have an entirely circular shape. It is simply necessary for a portion of the circumferential border to have a portion 54' which is positioned opposite the axial stop along the longitudinal axis 11.

The invention is likewise not limited to a system wherein the progression of the dose in the volume forming the infusion volume is performed by gravity. Indeed, it is possible to envisage that the relative sliding of the first part supporting the dose and the second movable part with respect to the first moves the dose to the infusion position at the end of travel and without the dose falling at the end of travel. The axial stop borne by the first part thus comes into contact with the dose if the latter is not suitable and blocks the sliding of the dose before it reaches the infusion position thereof at the end of travel. Therefore, it is simply necessary for the axial stop to be positioned on the sliding trajectory of the dose.

The axial stop is interconnected with the first part supporting the dose. For all that, the axial stop and the support zones may be formed by different parts. This may particularly be the case if the first part is interconnected with the frame.

| REFERENCES | |
|---|---|
| 1. | Dose |
| 10. | System |
| 11. | Longitudinal axis |
| 12. | Forward direction |
| 13. | Backward direction |
| 20. | Frame |
| 22. | Fixed chamber portion |
| 24. | Incoming fluid pipe |
| 25. | Shaft |
| 30. | Trap door |
| 40. | Hydraulic cylinder |
| 42. | Movable chamber portion |
| 44. | Second stripping means |
| 441. | Stripping finger |
| 442. | Stripping spring |
| 443. | Bearing surface |
| 45. | Discharge pipe |
| 46. | Guiding means |
| 460. | Hopper |
| 461. | Second part |
| 462. | Bearing surface |
| 463. | Lateral guiding surface |
| 47. | Housing for the spring |
| 50. | Dose |
| 51. | Volume containing the product to be infused |
| 52. | Circumferential border of dose |
| 53. | Rectilinear portion |
| 54. | Portion of dose entering the slot |
| 55. | Dose reinforcement |
| 56. | Connection fillet |
| 57. | Diameter |
| 60. | Closure device |
| 61. | Upstream closure means |
| 611. | First part |
| 612. | Bearing zone |
| 613. | Bearing zone |
| 614. | Slot |
| 615. | Axial stop |
| 616. | Plane |
| 617. | First space portion |
| 618. | Second space portion |
| 62. | Downstream closure means |
| 621. | Stripping member |
| 622. | Surface for receiving dose |
| 623. | Axial stripping stop |
| 63. | Obstructing means |
| 65. | Arm |
| 66. | End of travel stop |
| 69. | Slide |
| 7. | Infusion chamber |
| 100. | Thrust chamber |
| 101. | Thrust surface |
| 102. | Hydraulic cylinder base |
| 103. | Fitting means |
| 104. | Supply channel |
| 105. | Passage |
| 106. | Return spring |
| 107. | Stop for the hydraulic cylinder spring |
| 108. | Inlet of the liquid to be infused |
| 109. | Thrust fluid inlet |
| 110. | Seals |
| 111. | Seals |

The invention claimed is:

1. A system for making beverages from a dose comprising a product to be infused and having a circumferential border, the system comprising: first and second parts having a relative mobility while translating and defining in part at least one receiving assembly intended to receive the dose prior to the positioning thereof in an infusion position,
wherein the first part comprises at least one support zone configured to come into contact with the dose so as to support the dose in a first relative position of the first and second parts, the system being arranged in such a way that, during the relative translation of the first and second parts, the second part forms a bearing surface to induce the axial sliding of the dose along at least one support zone of the first part for the positioning thereof in the infusion position,
characterized in that the system also comprises at least one axial stop, interconnected with the first part, arranged below said at least one support zone along a projection on a vertical plane perpendicular to the axis of said translation, the axial stop being accessible from the space wherein the dose is intended to slide along the at least one support zone of the first part during the relative translation of the first and second parts; and
wherein the at least one support zone forms a vertical stop blocking the movement of the dose under the effect of the weight thereof, wherein the first part includes at least two support zones, wherein the two support zones define a horizontal plane along with first and second space portions situated above and below said plane, respectively, along a vertical direction, and wherein the axial stop is arranged in the second space portion so as to come into contact with a dose portion entering this second space portion while the dose bears on the at least two support zones.

2. The system according to claim 1, comprising the dose.

3. The system according to claim 1, wherein the axial stop is vertically accessible from the space wherein the dose is intended to slide along the at least one support zone of the first part during the relative translation of the first and second parts.

4. The system according to claim 1, wherein the axial stop is arranged to come into contact with a dose wherein the circumferential border would have a portion salient in the downward direction from a horizontal plane through the support zone, thus blocking the sliding of such a dose relative to the first part.

5. The system according to claim 1, wherein the at least one axial stop is entirely arranged below the support zone along a projection on a vertical plane perpendicular to the axis of said translation.

6. The system according to claim 1, comprising at least one opening borne by the first part and situated vertically below the support zone and situated between the at least two support zones, said opening giving access, along the vertical, to the axial stop.

7. The system according to claim 1, comprising at least one opening borne by the first part and situated vertically below the support zone, said axial stop being formed by an outline of the opening.

8. The system according to claim 1, comprising at least one open volume situated vertically below the support zone, the open volume being configured to enable access to the axial stop from the support zone.

9. The system according to claim 8 wherein the open volume is configured to be suitable for entry by a dose wherein the circumferential border has a portion salient in the downward direction when the dose is in the receiving assembly.

10. The system according to claim 8, wherein the open volume is formed by an opening defined by a circumferential border.

11. The system according to claim 10, wherein the opening forms a slot and the axial stop is formed by an outline of the slot.

12. The system according to claim 1, wherein the distance between said plane and the axial stop is between 0.5 mm and 5 mm.

13. The system according to claim 1, wherein the two support zones form two salient parts extending above a profile bearing the axial stop along a vertical direction.

14. The system according to claim 1, configured in such a way that, at the end of sliding, the first part is retracted, at least in part under the second part along a vertical direction such that the dose is movable under the effect of gravity.

15. The system according to claim 1, including a pump for supplying the infusion chamber with fluid, or an actuator for moving two chamber portions forming the infusion chamber in relation to one another and including slaving means arranged to prevent the operation of the pump if the first part prevents the sliding of the dose.

16. The system according to claim 1, wherein the first and second parts are movable and fixed respectively in relation to a frame of the system.

17. The system according to claim 1, wherein the first part forms upstream closure means or is interconnected with upstream closure means, the upstream closure means being arranged so as to selectively prevent or allow the entry of the dose into the infusion chamber according to the relative position of the first part with respect to the second part.

18. The system according to claim 1, comprising:
an infusion chamber for receiving a dose, wherein the infusion chamber is defined by at least one first and one second chamber portions, the chamber portions being arranged to move apart from one another or come together in order to respectively open or close the infusion chamber,
a closure device comprising:
the upstream closure means interconnected with the first part, and
downstream closure means arranged to selectively prevent or allow the dose to exit the infusion chamber, wherein the closure device is arranged so as to pass alternatively:
from said first position, the closure device being arranged so that in said first position:
the upstream closure means prevent the dose from entering the infusion chamber; and
the downstream closure means allow the dose to exit the infusion chamber; to a second position wherein:
the upstream closure means allow the dose to enter the infusion chamber at the end of sliding; and
the downstream closure means allow the reception of the dose introduced into the infusion chamber and prevent the latter from exiting the infusion chamber.

19. The system according to claim 18 wherein the upstream closure means and the downstream closure means are interconnected with each other.

20. The system according to claim 1, comprising guiding means arranged so as to guide the dose to be received on the first part and to maintain it in position until the end of sliding and wherein the bearing means of the second part are borne by the guiding means.

21. The system according to claim 1, wherein the bearing means are formed at least in part by an inner face of a hopper forming a guide for the dose when receiving same on the first part.

22. A machine for making beverages comprising a system according to claim 1, and an infusion chamber and a pump.

23. An assembly comprising at least one dose comprising a product to be infused and having a circumferential border and a system for making beverages from such a dose, the system comprising:
first and second parts having a relative mobility while translating and defining in part at least one receiving assembly intended to receive the dose prior to the positioning thereof in an infusion position;
the system being arranged in such a way that, during the relative translation of the first and second parts, the second part forms means for bearing on the dose to induce the sliding of the dose along at least one of a first and a second support zone of the first part for the positioning thereof in the infusion position;
wherein the first and the second support zones define a horizontal plane that separates first and second spaces along a vertical direction and the first and second support zones are adapted to support the circumferential border,
wherein the system also comprises at least one axial stop disposed in the second space, interconnected with the first part, and accessible from the first space in which the dose is intended to slide along the at least one support zone of the first part during the relative translation of the first and second parts,
wherein the circumferential border of the dose and the axial stop are arranged in relation to one another such that the dose is allowed to slide freely and be positioned in the infusion portion when the axial stop does not come into contact with the circumferential border of the dose; and
the axial stop is adapted to prevent the dose from sliding freely to be positioned in the infusion portion when the circumferential border contacts the axial stop.

24. The assembly according to claim 23 wherein the axial stop and the circumferential border of the dose have complementary shapes and arranged such that the axial stop does not come into contact with the dose when the dose slides on the first part.

25. The assembly according to claim 23, wherein the axial stop is arranged below said at least one support zone along a projection on a vertical plane perpendicular to the axis of said translation.

26. The assembly according to claim 23, wherein the first part comprises at least two support zones and the portion of the circumferential border of the dose intended to be positioned between the two support zones is rectilinear or concave.

27. The assembly according to claim 23, wherein the first part has at least two support zones, at least one opening situated between the two support zones, a portion of an outline of the opening forming the axial stop, wherein the dose has a reinforcement defining a portion at least of the circumferential border thereof and configured to bear on the two support zones, and wherein the reinforcement has a shape configured not to enter the opening when it bears on the two support zones.

28. The assembly according to claim 23 wherein the dose has a circumferential border having a polygonal and preferably square shape.

29. The assembly according to claim 23, wherein the dose includes a first coating and a second coating assembled at the periphery thereof in a joint face so as to define a volume for receiving the product to be infused, a length of one side of the dose being between 5 cm and 5.5 cm and wherein has an arc-shaped connection fillet at each of the corners thereof.

* * * * *